United States Patent
Coe-Sullivan et al.

(10) Patent No.: US 9,120,149 B2
(45) Date of Patent: Sep. 1, 2015

(54) METHODS AND ARTICLES INCLUDING NANOMATERIAL

(75) Inventors: Seth Coe-Sullivan, Belmont, MA (US); Joannis Kymissis, New York, NY (US)

(73) Assignee: QD VISION, INC., Lexington, MA (US)

( * ) Notice: Subject to any disclaimer, the term of this patent is extended or adjusted under 35 U.S.C. 154(b) by 752 days.

(21) Appl. No.: 12/317,249

(22) Filed: Dec. 19, 2008

(65) Prior Publication Data

US 2009/0283742 A1    Nov. 19, 2009

Related U.S. Application Data

(63) Continuation of application No. PCT/US2007/014706, filed on Jun. 25, 2007.

(60) Provisional application No. 60/805,738, filed on Jun. 24, 2006.

(51) Int. Cl.
| | |
|---|---|
| *B05D 5/06* | (2006.01) |
| *B22F 3/00* | (2006.01) |
| *B22F 1/00* | (2006.01) |
| *B82Y 30/00* | (2011.01) |

(52) U.S. Cl.
CPC .............. *B22F 3/008* (2013.01); *B22F 1/0025* (2013.01); *B82Y 30/00* (2013.01)

(58) Field of Classification Search
USPC ........ 264/272.17, 328.17; 977/833–838, 773, 977/939
See application file for complete search history.

(56) References Cited

U.S. PATENT DOCUMENTS

| | | | |
|---|---|---|---|
| 4,235,958 | A | 11/1980 | Barraud et al. |
| 4,957,808 | A | 9/1990 | Arai et al. |
| 5,099,256 | A | 3/1992 | Anderson et al. |
| 5,512,131 | A | 4/1996 | Kumar et al. |
| 5,537,000 | A | 7/1996 | Alivisatos et al. |
| 5,559,057 | A | 9/1996 | Goldstein |
| 5,574,291 | A | 11/1996 | Dodabalapur et al. |
| 5,669,303 | A | 9/1997 | Maracas et al. |
| 5,755,883 | A | 5/1998 | Kinose et al. |
| 5,853,446 | A | 12/1998 | Carre et al. |
| 5,882,779 | A | 3/1999 | Lawandy |
| 5,900,160 | A | 5/1999 | Whitesides et al. |
| 5,937,758 | A | 8/1999 | Maracas et al. |

(Continued)

FOREIGN PATENT DOCUMENTS

| | | |
|---|---|---|
| EP | 0954205 | 3/1999 |
| EP | 1065725 | 3/2001 |

(Continued)

OTHER PUBLICATIONS

Adachi et al., High-efficiency red electrophosphorescence devices, Appl. Phys. Lett. 78, 1622 (2001).

(Continued)

*Primary Examiner* — Stella Yi

(57) ABSTRACT

A method of depositing a nanomaterial onto a donor surface comprises depositing a composition comprising nanomaterial onto a donor surface from a micro-dispenser. In another aspect of the invention there is provided a method of depositing a nanomaterial onto a substrate. Methods of making a device including nanomaterial are disclosed. An article of manufacture comprising nanomaterial and a material capable of transporting charge disposed on a backing member is disclosed.

8 Claims, 1 Drawing Sheet

(56) References Cited

U.S. PATENT DOCUMENTS

| | | |
|---|---|---|
| 5,997,958 A | 12/1999 | Sato et al. |
| 6,001,515 A | 12/1999 | Evans et al. |
| 6,069,442 A | 5/2000 | Hung et al. |
| 6,157,047 A | 12/2000 | Fujita et al. |
| 6,180,239 B1 | 1/2001 | Whitesides et al. |
| 6,239,355 B1 | 5/2001 | Salafsky |
| 6,251,303 B1 | 6/2001 | Bawendi et al. |
| 6,259,506 B1 | 7/2001 | Lawandy |
| 6,276,266 B1 | 8/2001 | Dietz et al. |
| 6,294,401 B1 | 9/2001 | Jacobson et al. |
| 6,303,238 B1 * | 10/2001 | Thompson et al. ............ 428/690 |
| 6,322,901 B1 | 11/2001 | Bawendi et al. |
| 6,348,295 B1 | 2/2002 | Griffith et al. |
| 6,410,416 B1 | 6/2002 | Dodabalapur et al. |
| 6,420,200 B1 | 7/2002 | Yamazaki et al. |
| 6,460,985 B1 | 10/2002 | Olsen |
| 6,464,898 B1 | 10/2002 | Tomoike |
| 6,470,904 B1 | 10/2002 | Tai et al. |
| 6,494,570 B1 | 12/2002 | Snyder |
| 6,515,314 B1 | 2/2003 | Duggal et al. |
| 6,518,168 B1 | 2/2003 | Clem et al. |
| 6,544,808 B2 | 4/2003 | Hoon |
| 6,576,155 B1 | 6/2003 | Barbera-Guillem |
| 6,576,291 B2 | 6/2003 | Bawendi et al. |
| 6,593,690 B1 | 7/2003 | Mccormick et al. |
| 6,601,944 B1 | 8/2003 | Kawazoe |
| 6,639,527 B2 | 10/2003 | Johnson et al. |
| 6,669,801 B2 | 12/2003 | Yoshimura et al. |
| 6,682,189 B2 | 1/2004 | May et al. |
| 6,692,832 B2 | 2/2004 | Murphy |
| 6,703,781 B2 | 3/2004 | Zovko |
| 6,722,760 B2 | 4/2004 | Jeong et al. |
| 6,730,356 B2 | 5/2004 | Kim et al. |
| 6,732,643 B2 | 5/2004 | Kwon et al. |
| 6,736,985 B1 | 5/2004 | Bao et al. |
| 6,737,287 B1 | 5/2004 | Furuse et al. |
| 6,770,502 B2 | 8/2004 | Cok et al. |
| 6,776,094 B1 | 8/2004 | Whitesides et al. |
| 6,797,412 B1 | 9/2004 | Jain et al. |
| 6,827,769 B2 | 12/2004 | Auslander et al. |
| 6,835,583 B2 | 12/2004 | Yi et al. |
| 6,840,167 B2 | 1/2005 | Clark et al. |
| 6,860,199 B2 | 3/2005 | Lee et al. |
| 6,864,626 B1 | 3/2005 | Weiss et al. |
| 6,875,704 B2 | 4/2005 | Baek et al. |
| 6,876,796 B2 | 4/2005 | Garito et al. |
| 6,887,332 B1 | 5/2005 | Kagan et al. |
| 6,918,338 B2 | 7/2005 | Thiessen et al. |
| 6,929,762 B2 | 8/2005 | Rubin |
| 6,936,181 B2 | 8/2005 | Bulthaup et al. |
| 6,946,332 B2 | 9/2005 | Loo et al. |
| 6,957,608 B1 | 10/2005 | Hubert et al. |
| 6,982,179 B2 | 1/2006 | Kwong et al. |
| 6,997,539 B2 | 2/2006 | Hoisington et al. |
| 7,008,559 B2 | 3/2006 | Chen |
| 7,011,936 B2 | 3/2006 | Moynihan et al. |
| 7,015,640 B2 | 3/2006 | Schaepkens et al. |
| 7,067,328 B2 | 6/2006 | Dubrow et al. |
| 7,115,216 B2 | 10/2006 | Carter et al. |
| 7,160,613 B2 | 1/2007 | Bawendi et al. |
| 7,232,771 B2 | 6/2007 | Jacobs et al. |
| 7,253,452 B2 | 8/2007 | Steckel et al. |
| 7,265,037 B2 | 9/2007 | Yang et al. |
| 7,294,861 B2 | 11/2007 | Schardt |
| 7,317,047 B2 | 1/2008 | Hsu |
| 7,332,211 B1 | 2/2008 | Bulovic et al. |
| 7,390,568 B2 | 6/2008 | Kim et al. |
| 7,430,355 B2 | 9/2008 | Heikenfeld et al. |
| 7,592,269 B2 | 9/2009 | Jacobs |
| 7,615,179 B2 | 11/2009 | Dumond et al. |
| 7,700,200 B2 | 4/2010 | Bulovic et al. |
| 7,880,377 B2 | 2/2011 | Orita et al. |
| 8,062,701 B2 | 11/2011 | McClure et al. |
| 8,277,942 B2 | 10/2012 | Kim et al. |
| 8,470,617 B2 | 6/2013 | Coe-Sullivan et al. |
| 8,618,561 B2 | 12/2013 | Coe-Sullivan |
| 8,876,272 B2 | 11/2014 | Linton et al. |
| 8,906,804 B2 | 12/2014 | Coe-Sullivan et al. |
| 2001/0001050 A1 | 5/2001 | Miyashita et al. |
| 2002/0001026 A1 | 1/2002 | Ishikawa et al. |
| 2002/0047560 A1 | 4/2002 | Lee et al. |
| 2002/0053320 A1 | 5/2002 | Duthaler et al. |
| 2002/0074565 A1 | 6/2002 | Flagan et al. |
| 2002/0075422 A1 | 6/2002 | Kimura et al. |
| 2002/0157574 A1 | 10/2002 | Weitzel et al. |
| 2002/0186921 A1 | 12/2002 | Schumacher et al. |
| 2002/0187347 A1 | 12/2002 | Halas et al. |
| 2003/0003300 A1 | 1/2003 | Korgel et al. |
| 2003/0010241 A1 | 1/2003 | Fujihira et al. |
| 2003/0030706 A1 | 2/2003 | Jagannathan et al. |
| 2003/0035917 A1 | 2/2003 | Hyman |
| 2003/0041444 A1 | 3/2003 | Debe et al. |
| 2003/0042850 A1 | 3/2003 | Bertram et al. |
| 2003/0047535 A1 | 3/2003 | Schueller et al. |
| 2003/0048346 A1 | 3/2003 | Chow |
| 2003/0054957 A1 | 3/2003 | Irvin et al. |
| 2003/0067529 A1 | 4/2003 | May et al. |
| 2003/0068446 A1 | 4/2003 | Mirkin et al. |
| 2003/0095170 A1 | 5/2003 | Johnson |
| 2003/0103123 A1 | 6/2003 | Snyder |
| 2003/0124260 A1 | 7/2003 | Baeck |
| 2003/0124866 A1 | 7/2003 | Kim et al. |
| 2003/0140982 A1 | 7/2003 | Seki et al. |
| 2003/0152703 A1 | 8/2003 | Hammond et al. |
| 2003/0156992 A1 | 8/2003 | Anderson et al. |
| 2003/0160260 A1 | 8/2003 | Hirai et al. |
| 2003/0175411 A1 | 9/2003 | Kodas et al. |
| 2003/0186914 A1 | 10/2003 | Hofer et al. |
| 2003/0213382 A1 | 11/2003 | Kendale et al. |
| 2003/0219920 A1 | 11/2003 | Baek et al. |
| 2003/0230970 A1 | 12/2003 | Steckl et al. |
| 2004/0007169 A1 | 1/2004 | Ohtsu et al. |
| 2004/0023010 A1 | 2/2004 | Bulovic et al. |
| 2004/0027062 A1 | 2/2004 | Shiang et al. |
| 2004/0027327 A1 | 2/2004 | LeCain et al. |
| 2004/0028875 A1 | 2/2004 | Van Rijn et al. |
| 2004/0091710 A1 | 5/2004 | Bawendi et al. |
| 2004/0095658 A1 | 5/2004 | Buretea et al. |
| 2004/0104660 A1 | 6/2004 | Okamoto et al. |
| 2004/0108808 A1 | 6/2004 | Kumagai et al. |
| 2004/0109057 A1 | 6/2004 | Pan et al. |
| 2004/0110002 A1 | 6/2004 | Kim et al. |
| 2004/0127135 A1 | 7/2004 | Baek et al. |
| 2004/0131789 A1 | 7/2004 | Brown |
| 2004/0137263 A1 | 7/2004 | Burn et al. |
| 2004/0147113 A1 | 7/2004 | Yamazaki et al. |
| 2004/0160154 A1 | 8/2004 | Nishimura et al. |
| 2004/0166235 A1 | 8/2004 | Fujii et al. |
| 2004/0173807 A1 | 9/2004 | Tian et al. |
| 2004/0206942 A1 | 10/2004 | Hsu |
| 2004/0217696 A1 | 11/2004 | Kim et al. |
| 2004/0265492 A1 | 12/2004 | Free et al. |
| 2004/0265622 A1 | 12/2004 | Sadasivan et al. |
| 2005/0009224 A1 | 1/2005 | Yang et al. |
| 2005/0028691 A1 | 2/2005 | Baek |
| 2005/0035346 A1 | 2/2005 | Bazan et al. |
| 2005/0045269 A1 | 3/2005 | Tateishi |
| 2005/0045900 A1 | 3/2005 | Silvernail et al. |
| 2005/0048295 A1 | 3/2005 | Kim et al. |
| 2005/0051777 A1 | 3/2005 | Hill |
| 2005/0054004 A1 * | 3/2005 | Alivisatos et al. ............ 435/7.1 |
| 2005/0058416 A1 | 3/2005 | Hoon Lee et al. |
| 2005/0069644 A1 | 3/2005 | Hsieh et al. |
| 2005/0072989 A1 | 4/2005 | Bawendi et al. |
| 2005/0074589 A1 | 4/2005 | Pan et al. |
| 2005/0081983 A1 | 4/2005 | Nakayama et al. |
| 2005/0095736 A1 | 5/2005 | Padiyath et al. |
| 2005/0098205 A1 | 5/2005 | Roscheisen |
| 2005/0116621 A1 | 6/2005 | Bellman et al. |
| 2005/0116633 A1 | 6/2005 | Yamasaki et al. |
| 2005/0117868 A1 | 6/2005 | Chen et al. |
| 2005/0118338 A1 | 6/2005 | Stebe et al. |
| 2005/0118403 A1 | 6/2005 | Anazawa et al. |
| 2005/0126628 A1 * | 6/2005 | Scher et al. .................... 136/263 |

(56) References Cited

U.S. PATENT DOCUMENTS

| | | |
|---|---|---|
| 2005/0129867 A1 | 6/2005 | Picard et al. |
| 2005/0146551 A1 | 7/2005 | Yamazaki et al. |
| 2005/0147849 A1 | 7/2005 | Wolk |
| 2005/0157157 A1 | 7/2005 | Tsukamoto et al. |
| 2005/0163934 A1 | 7/2005 | Ruschak et al. |
| 2005/0186363 A1 | 8/2005 | DeVisser et al. |
| 2005/0186405 A1 | 8/2005 | Jeong et al. |
| 2005/0189883 A1 | 9/2005 | Suh et al. |
| 2005/0191448 A1 | 9/2005 | Suh et al. |
| 2005/0214536 A1 | 9/2005 | Schrier et al. |
| 2005/0214967 A1 | 9/2005 | Scher et al. |
| 2005/0227063 A1 | 10/2005 | Lawandy |
| 2005/0230356 A1 | 10/2005 | Empedocles et al. |
| 2005/0241573 A1 | 11/2005 | Ogawa et al. |
| 2005/0242346 A1 | 11/2005 | Forrest et al. |
| 2005/0243233 A1 | 11/2005 | Kim |
| 2005/0244990 A1 | 11/2005 | Kim |
| 2005/0245085 A1 | 11/2005 | Yoo |
| 2005/0249901 A1 | 11/2005 | Yializis et al. |
| 2005/0250052 A1 | 11/2005 | Nguyen |
| 2005/0260274 A1 | 11/2005 | Chinea et al. |
| 2005/0263025 A1 | 12/2005 | Blees |
| 2005/0270312 A1 | 12/2005 | Lad et al. |
| 2005/0272159 A1 | 12/2005 | Ismagilov et al. |
| 2005/0274944 A1 | 12/2005 | Jang |
| 2006/0003097 A1 | 1/2006 | Andres et al. |
| 2006/0003114 A1 | 1/2006 | Enlow et al. |
| 2006/0021533 A1 | 2/2006 | Jeans |
| 2006/0038182 A1 | 2/2006 | Rogers et al. |
| 2006/0042685 A1 | 3/2006 | Wang |
| 2006/0043361 A1 | 3/2006 | Lee et al. |
| 2006/0057480 A1 | 3/2006 | Lin et al. |
| 2006/0063351 A1 | 3/2006 | Jain |
| 2006/0081557 A1 | 4/2006 | Xu et al. |
| 2006/0097264 A1 | 5/2006 | Kim et al. |
| 2006/0141245 A1 | 6/2006 | Stellacci et al. |
| 2006/0196375 A1 | 9/2006 | Coe-Sullivan et al. |
| 2006/0197437 A1 | 9/2006 | Krummacher et al. |
| 2006/0199096 A1 | 9/2006 | Keusseyan |
| 2006/0270233 A1 | 11/2006 | Xia et al. |
| 2006/0293409 A1 | 12/2006 | Sanchez et al. |
| 2007/0001581 A1 | 1/2007 | Stasiak et al. |
| 2007/0007511 A1 | 1/2007 | Choi et al. |
| 2007/0045777 A1* | 3/2007 | Gillies et al. .............. 257/613 |
| 2007/0103068 A1 | 5/2007 | Bawendi et al. |
| 2007/0200492 A1 | 8/2007 | Cok et al. |
| 2007/0247061 A1 | 10/2007 | Adamovich et al. |
| 2007/0257608 A1 | 11/2007 | Tyan et al. |
| 2007/0281140 A1 | 12/2007 | Haubrich et al. |
| 2008/0001167 A1 | 1/2008 | Coe-Sullivan et al. |
| 2008/0074050 A1 | 3/2008 | Chen et al. |
| 2008/0078302 A1 | 4/2008 | Lee et al. |
| 2008/0083926 A1 | 4/2008 | Ostergard |
| 2008/0090928 A1 | 4/2008 | Iftime et al. |
| 2008/0150425 A1 | 6/2008 | Cho et al. |
| 2008/0165235 A1 | 7/2008 | Rolly et al. |
| 2008/0169753 A1 | 7/2008 | Skipor et al. |
| 2008/0172191 A1 | 7/2008 | Skipor et al. |
| 2008/0172197 A1 | 7/2008 | Skipor et al. |
| 2008/0173886 A1 | 7/2008 | Cheon et al. |
| 2008/0203895 A1 | 8/2008 | Miller et al. |
| 2008/0238294 A1 | 10/2008 | Xu et al. |
| 2008/0239644 A1 | 10/2008 | Cassidy et al. |
| 2008/0308037 A1 | 12/2008 | Bulovic et al. |
| 2009/0001385 A1 | 1/2009 | Skipor et al. |
| 2009/0001403 A1 | 1/2009 | Skipor et al. |
| 2009/0017268 A1 | 1/2009 | Skipor et al. |
| 2009/0039764 A1 | 2/2009 | Cho et al. |
| 2009/0059554 A1 | 3/2009 | Skipor et al. |
| 2009/0152567 A1 | 6/2009 | Comerford et al. |
| 2009/0162011 A1 | 6/2009 | Coe-Sullivan et al. |
| 2009/0174022 A1 | 7/2009 | Coe-Sullivan et al. |
| 2009/0181478 A1 | 7/2009 | Cox et al. |
| 2009/0208753 A1 | 8/2009 | Coe-Sullivan et al. |
| 2009/0215208 A1 | 8/2009 | Coe-Sullivan et al. |
| 2009/0215209 A1 | 8/2009 | Anc et al. |
| 2009/0278141 A1 | 11/2009 | Coe-Sullivan et al. |
| 2009/0280586 A1 | 11/2009 | Coe-Sullivan |
| 2009/0283743 A1 | 11/2009 | Coe-Sullivan et al. |
| 2009/0283778 A1 | 11/2009 | Coe-Sullivan et al. |
| 2009/0286338 A1 | 11/2009 | Coe-Sullivan et al. |
| 2009/0314991 A1 | 12/2009 | Cho et al. |
| 2009/0320909 A1 | 12/2009 | Arango et al. |
| 2010/0001256 A1 | 1/2010 | Coe-Sullivan et al. |
| 2010/0014799 A1 | 1/2010 | Bulovic et al. |
| 2010/0044635 A1 | 2/2010 | Breen et al. |
| 2010/0051901 A1 | 3/2010 | Kazlas et al. |
| 2010/0068468 A1 | 3/2010 | Coe-Sullivan et al. |
| 2010/0132770 A1 | 6/2010 | Beatty et al. |
| 2010/0134520 A1 | 6/2010 | Coe-Sullivan et al. |
| 2010/0265307 A1 | 10/2010 | Linton et al. |
| 2010/0283036 A1 | 11/2010 | Coe-Sullivan et al. |
| 2011/0095261 A1 | 4/2011 | Kazlas et al. |

FOREIGN PATENT DOCUMENTS

| | | |
|---|---|---|
| EP | 1424732 | 6/2004 |
| EP | 1442885 | 8/2004 |
| JP | 6286289 | 10/1994 |
| JP | 7156524 | 6/1995 |
| JP | 8034116 | 2/1996 |
| JP | 8072384 | 3/1996 |
| JP | 10186350 | 7/1998 |
| JP | 11340516 | 12/1999 |
| JP | 2000238402 | 9/2000 |
| JP | 2002192540 | 7/2002 |
| JP | 2003039399 | 2/2003 |
| JP | 2004071357 | 3/2004 |
| JP | 2004172102 | 6/2004 |
| JP | 2004253175 | 9/2004 |
| JP | 2004303592 | 10/2004 |
| JP | 5116475 | 4/2005 |
| JP | 2005169912 | 6/2005 |
| JP | 2005305674 | 11/2005 |
| KR | 2004-000011 | 1/2004 |
| KR | 20090073477 | 7/2009 |
| WO | WO-00/20916 | 4/2000 |
| WO | WO-02/091803 | 11/2002 |
| WO | WO-2004/004025 | 1/2004 |
| WO | WO 2005/055330 A1 | 6/2005 |
| WO | WO-2006/047215 A3 | 5/2006 |
| WO | WO-2006/088877 A1 | 8/2006 |
| WO | WO-2006/135435 A3 | 12/2006 |
| WO | WO-2007/117668 A3 | 10/2007 |
| WO | WO-2007/117672 A3 | 10/2007 |
| WO | WO-2007/117698 A3 | 10/2007 |
| WO | WO-2008/111947 A1 | 9/2008 |
| WO | WO-2008/105792 A3 | 10/2008 |
| WO | WO-2008/108798 A3 | 10/2008 |
| WO | WO-2007/120877 A3 | 11/2008 |
| WO | WO-2007/143197 A3 | 11/2008 |

OTHER PUBLICATIONS

Arango, Alexi Cosmos, Thesis of entitled "A Quantum Dot Heterojunction Photodetector" Submitted to the Department of Electrical Engineering and Computer Science, in partial fulfillment of the requirements for the degree of Masters of Science in Computer Science and Engineering at the Massachusetts Institute of Technology, Feb. 2005.

Bulovic et al., Semiconductors and Semimetals 64, 255 (2000).

Chan, Y., et al. "Multiexcitonic two-state lasing in a CdSe nanocrystal laser", 2004 Appl. Phys. Lett. vol. 85, No. 13, pp. 2460-2462.

Coe, et al., "Electroluminescence from single monolayers of nanocrystals in molecular organic devices", Nature, vol. 420, No. 6917, pp. 800-803 (2002).

Coe-Sullivan, et al, "Tuning the performance of hybrid organic/inorganic quantum dot light-emitting devices", Organic Electronics 4 (2003) 123-130.

Coe-Sullivan, et al., "Method for fabrication of saturated RGB quantum dot light emitting devices". Proc. Of SPIE vol. 5739, pp. 108-115 (2005).

(56) References Cited

OTHER PUBLICATIONS

Coe-Sullivan, et al. "Large-Area Ordered Quantum-Dot Monolayers via Phase Separation During Spin-Casting", Adv. Funct. Mater. 2005, 15, 1117-1124.
Coe-Sullivan, S.__MIT, PhD__Thesis__Jun. 2005, "Hybrid Organic/Quantum Dot Thin Film Structures and Devices".
D'Andrade et al., "Organic Optoelectronic Materials, Processing, and Devices", MRS Fall Meeting, BB6.2 (2001).
Dabbousi et al., "(CdSe) ZnS Core-Shell Quantum Dots : Synthesis and Characterization of a Size Series of Highly Luminescent Nanocrystallites", J. Phys. Chem. 101, 9463 (1997).
Dirr et al., "Organic Light Emitting Diodes with Reduced Spectral and Spacial Halfwidths">> Jpn. J. Appl. Phys. 37, 1457 (1998).
Final Office Action, mailed Jul. 20, 2012 in copending U.S. Appl. No. 12/287,270.
Final Office Action, mailed Mar. 30, 2011 in copending U.S. Appl. No. 12/317,250.
Final Office Action, mailed Apr. 23, 2012 in copending U.S. Appl. No. 12/317,255.
Final Office Action mailed Mar. 27, 2012 in copending U.S. Appl. No. 12/381,524.
Final Office Action mailed Oct. 12, 2011 in copending U.S. Appl. No. 12/655,074.
Gao, et al., "Lateral patterning of CdTe nanocrystal films by the electric field directed layer-by-layer assembly method", Langmuir, 2002, 18, 4098-4102.
Huang, H., "Bias-Induced Photoluminnescence Quenching of Single Colloidal Quantym Dots Embedded in Organic Semiconductors", Nano Letters, 2007, vol. 7, No. 12 3781-3786.
Kim, "Full-Colour Quantum Dot Displays Fabricated by Transfer Printing ", Nature Photonics, doi:10.1038/NPHOTON.2011,12 (2011) (published online Feb. 20, 2011).
Kim, et al., Contact Printing of Quantum Dot Light-emitting Devices, Nano Letters, 2008, vol. 8, No. 12, 4513-4517.
Kirstein, et al., "Herringbone Structures In Two-Dimensional Single Crystals of Cyanine Dyes. I. Detailed Structure Analysis Using Electron Diffraction", J. Chem. Phys. 103(2) Jul. 1995, pp. 818 et seq.
Kirstein, et al., "Herringbone Structures In Two-Dimensional Single Crystals of Cyanine Dyes. II. Optical Properties", J. Chem. Phys. 103(2) Jul. 1995, pp. 826 et seq.
Kohli, N., et al., "Intact transfer of layered, bionanocomposite arrays by microcontact printing", Chem. Commun., 2005, 316-318.
Kumar, and G. Whitesides, "Features of gold having micrometer to centimeter dimensions can be formed through a combination of stamping with an elastomeric stamp and an alkanethiol "ink" followed by chemical etching" *Applied Physics Letters*, 63, 2002-2004, (1993).
Lee, "Organic light-emitting diodes formed by soft contact lamination", PNAS, Jan. 13, 2004, vol. 101, No. 2, 429-433.
Lin, et al, "Formation of Long-range-ordered Nanocrsytal Superlattices on Silicon Nitride Substrates", j. Phys. Chem. B 2001, 105, 3353-3357.
Maenosono, Shinya; et al., "Overview of Nanoparticle Array Formation by Wet Coating", Journal of Nanoparticle Research 5:5-15, 2003.
Meitl, Matthew, et al., "Transfer Printing By Kinetic Control Of Adhesion To An Elastomeric Stamp", Nature Materials 5, 33-38 (Jan. 1, 2006) Letters.
Merali, "Connect the Quantum Dots for a Full-Colour Image", Nature/doi:10.1038/news.2011.109 (published online Feb. 20, 2011).
Mills, Dr. Ross, Ink Jet as a Manufacturing Process Symposium, iTi Corp. 2008.
Mishra, et al. "Cyanines During the 1990s: A Review", Chem. Rev. 2000, 100, 1973-2011.
Moeller, G., et al., "Quantum-Dot Light-Emitting Devices for Displays", OLED Materials, Information Display, Feb. 2-6, 2006.
Office Action mailed Feb. 22, 2012 in copending U.S. Appl. No. 12/287,145.
PCT Search Report and Written Opinion for PCT/US2007/008705 mailed Aug. 3, 2008.
PCT Search Report and Written Opinion for PCT/US2007/008721 mailed Aug. 8, 2008.
PCT Search Report and Written Opinion for PCT/US2007/008873 mailed Jan. 11, 2008.
PCT Search Report and Written Opinion for PCT/US2007/009255 mailed Aug. 11, 2006.
PCT Search Report and Written Opinion for PCT/US2007/014705 mailed Aug. 19, 2008.
PCT Search Report and Written Opinion for PCT/US2007/014706 mailed Jul. 22, 2008.
PCT Search Report and Written Opinion for PCT/US2007/014711 mailed Aug. 19, 2008.
PCT Search Report and Written Opinion for PCT/US2007/019797 mailed Apr. 11, 2008.
PCT Search Report and Written Opinion for PCT/US2007/024750 mailed Apr. 22, 2008.
PCT Search Report and Written Opinion for PCT/US2008/007901 mailed Jan. 21, 2009.
PCT Search Report and Written Opinion for PCT/US2008/007902 mailed Sep. 11, 2008.
Santhanam and R. P. Andres, "Microcontact Printing of Uniform Nanoparticle Arrays", Nano Letters, 4, 41-44, (2004).
Santhanam, et al., "Self-Assembly of Uniform Monolayer Arrays of Nanoparticles", Langmuir, 19, 7881-7887, (2003).
Sargent, Edward H. "Infrared Quantum Dots" Adv. Mater. 2005, 17, No. 5, Mar. 8.
Savage, "Quantum Dots Set to Permeate the Next Generation of Displays" http://www.photonics.com/Article.aspx?AID=46864_ published online 2001.
Schlamp, et al., <<Improved efficiencies in light emitting diodes made with CdSe(CdS) core/shell type nanocrystals and a semiconducting polymer >>, J. Appl. Phys., 82, 5837-5842, (1997).
Schoeppler, Martin, Simple Tools for Ink Jet Printing on Flexible Substrates—Feb. 7-9, 2006.
Sirringhaus, H., et al., "Inkjet Printing of Functional Materials", Mrs. Bulletin/Nov. 2003 802-803.
Tullo, Alexander H., "Printable electronics is attracting growing interest and is gearing up for commercial applications", Chemical & Engineering News, Feb. 13, 2006, vol. 84, No. 7, pp. 45-51.
Wu, et al., <<Microcontact Printing of CdS/Dendrimer Nanocomposite Patterns on Silicon Wafters >>, Adv. Mater. Mar. 5, 2004, vol. 16, No. 5, pp. 413-417.
Yamasaki et al., <<Organic light-emitting device with an ordered monolayer of silica microspheres as a scattering medium >>, Appl. Phys. Lett. 76, 1243 (2000).
Anikeeva, et al., "Photoluminescence of CdSe/ZnS core/shell quantum dots enhanced by energy transfer from a phosphorescent donor", *Chem. Phys. Lett.* 424 (2006), pp. 120-125.

\* cited by examiner

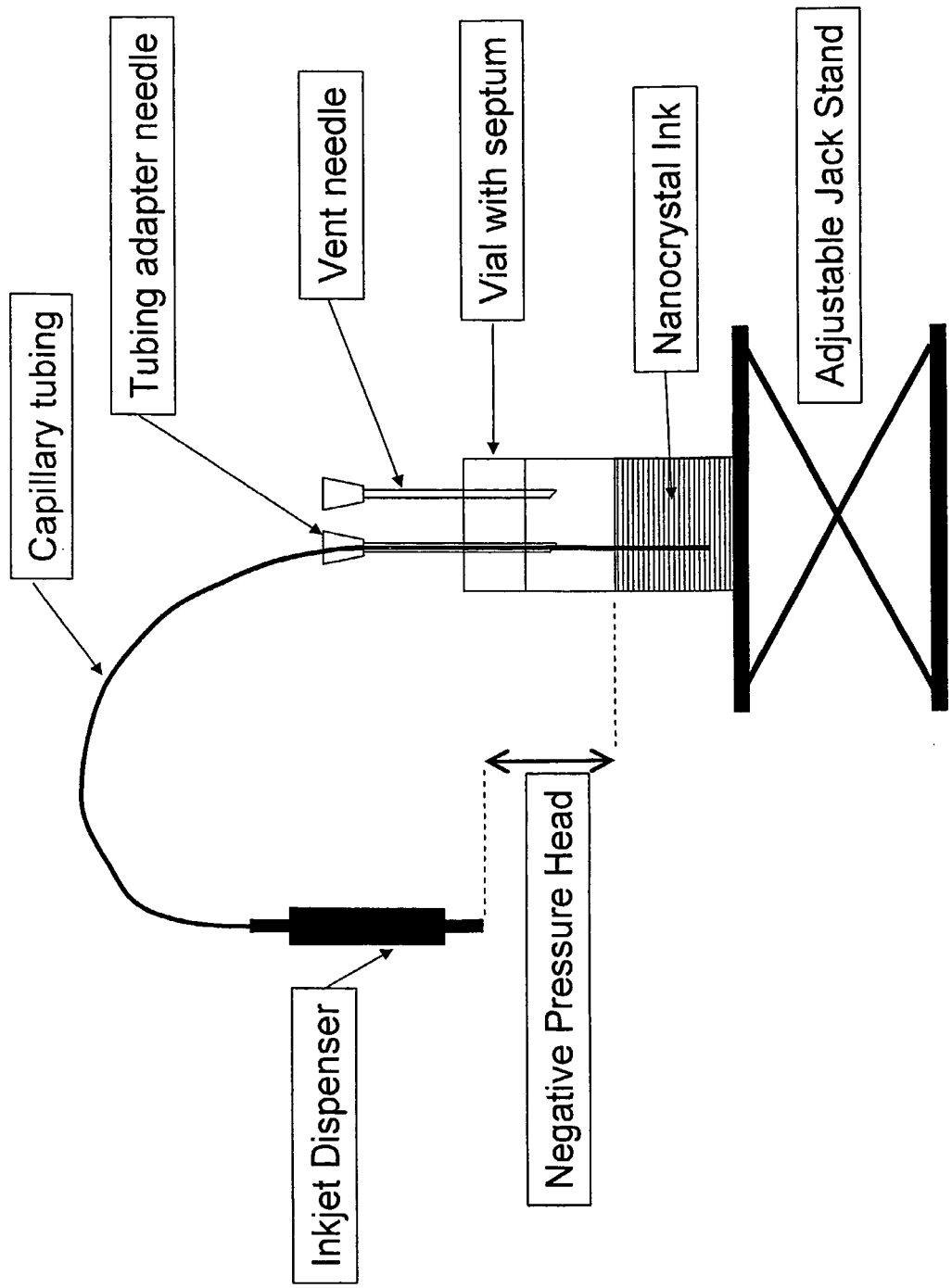

METHODS AND ARTICLES INCLUDING NANOMATERIAL

This application is a continuation of commonly owned PCT Application No. PCT/US2007/014706 filed 25 Jun. 2007, which was published in the English language as PCT Publication No. WO 2008/111947 on 18 Sep. 2008. The PCT Application claims priority from commonly owned U.S. Patent Application No. 60/805,738 filed 24 Jun. 2006. The disclosures of each of the above-listed applications are hereby incorporated herein by reference in their entireties.

TECHNICAL FIELD OF THE INVENTION

The invention relates to the technical field of nanomaterials, including but not limited to, articles including nanomaterial and methods for depositing nanomaterial and method for fabricating devices including nanomaterial.

BACKGROUND OF THE INVENTION

A number of industries, e.g., electronics, displays, lighting, optoelectronics, and energy industries, rely on the formation of layers, coatings and/or patterns of materials on substrates in the fabrication of a variety of products, product components, product accessories, etc.

SUMMARY OF THE INVENTION

It has been recognized that it would be advantageous to develop improved articles of manufacture including nanomaterial, methods for depositing nanomaterial, and methods for making a device including nanomaterial.

In one aspect of the invention there is provided a method of depositing nanomaterial onto a donor surface. In a detailed aspect, the method comprises depositing a composition comprising nanomaterial and liquid onto a donor surface from a micro-dispenser. In certain embodiments, the nanomaterial comprises semiconductor nanocrystals.

In certain embodiments, the composition is deposited in a predetermined arrangement. For example, the composition can be deposited in a patterned or unpatterned arrangement.

In certain embodiments, the method further comprises removing liquid from the composition disposed on the donor surface.

In another aspect of the invention there is provided a method of depositing a nanomaterial onto a substrate. The method comprises method comprises depositing a composition comprising nanomaterial and liquid onto a donor surface from a micro-dispenser, and depositing at least a portion of the composition disposed on the donor surface onto the substrate. In certain embodiments, the nanomaterial comprises semiconductor nanocrystals In certain embodiments, the composition is deposited in a predetermined arrangement. For example, the composition can be deposited in a patterned or unpatterned arrangement.

In another aspect of the invention there is provided a method of depositing nanomaterial onto a substrate. The method comprises method comprises depositing a composition comprising nanomaterial and liquid onto a donor surface from a micro-dispenser, and removing liquid from the composition disposed on the donor surface before depositing at least a portion of the substantially liquid-free composition onto the substrate.

In certain embodiments, the composition is deposited in a predetermined arrangement. For example, the composition can be deposited in a patterned or unpatterned arrangement.

In another aspect of the invention there is provided a method of depositing nanomaterial onto a substrate. The method comprises method comprises depositing a composition comprising nanomaterial and liquid onto a donor surface from a micro-dispenser, transferring at least a portion of the composition disposed on the donor surface to a transfer surface, and depositing at least a portion of the composition disposed on the transfer surface onto the substrate. In certain embodiments, the nanomaterial comprises semiconductor nanocrystals In certain embodiments, the composition is deposited in a predetermined arrangement. For example, the composition can be deposited in a patterned or unpatterned arrangement.

In another aspect of the invention there is provided a method of depositing nanomaterial onto a substrate. The method comprises method comprises depositing a composition comprising nanomaterial and liquid onto a donor surface from a micro-dispenser; removing liquid from the composition disposed on the donor surface before transferring at least a portion of the substantially liquid-free composition to a transfer surface; and depositing at least a portion of the substantially liquid-free composition disposed on the transfer surface onto the substrate. In certain embodiments, the nanomaterial comprises semiconductor nanocrystals In certain embodiments, the composition is deposited in a predetermined arrangement. For example, the composition can be deposited in a patterned or unpatterned arrangement.

In another aspect of the invention there is provided a method of depositing nanomaterial onto a substrate. The method comprises method comprises depositing a composition comprising nanomaterial and liquid onto a donor surface from a micro-dispenser; transferring at least a portion of the composition disposed on the donor surface to a transfer surface; and removing liquid from the composition disposed on the transfer surface before depositing at least a portion of the substantially liquid-free composition from the transfer surface onto the substrate. In certain embodiments, the nanomaterial comprises semiconductor nanocrystals In certain embodiments, the composition is deposited in a predetermined arrangement. For example, the composition can be deposited in a patterned or unpatterned arrangement.

In another aspect of the invention there is provided a method of depositing a layer comprising nanomaterial onto a donor surface. The method comprises depositing a composition comprising nanomaterial and liquid onto a donor surface from a micro-dispenser wherein the donor surface includes a surface treatment such that the nanomaterial is reversibly attached to the donor surface. In certain embodiments, the donor surface comprises a film.

In certain embodiments, the composition is deposited in a predetermined arrangement. For example, the composition can be deposited in a patterned or unpatterned arrangement.

In another aspect of the invention there is provided a method for making a device. The method comprises: depositing a composition comprising nanomaterial and liquid onto a donor surface from a micro-dispenser to form a layer comprising nanomaterial on the donor surface; contacting the layer comprising nanomaterial to a surface of a substrate. In certain embodiments, the layer comprising nanomaterial is contacted to the surface of the substrate under conditions to cause the layer comprising nanomaterial to deposit onto the substrate. In certain embodiments, the donor surface comprises a film. In a detailed aspect, the method can optionally further include removing the donor surface from the layer of nanomaterial deposited on the surface.

In certain embodiments, the composition is deposited in a predetermined arrangement. For example, the composition can be deposited in a patterned or unpatterned arrangement.

In the various aspects and embodiments described herein, the composition can optionally further include a material capable of transporting charge. In certain embodiments, the composition comprises a nanomaterial comprising semiconductor nanocrystals, a material capable of transporting charge, and a liquid, wherein the material capable of transporting charge has a triplet energy which is at least greater than the bandgap of the semiconductor nanocrystals included in the composition.

In one aspect of the invention there is provided an article of manufacture comprising a layer comprising nanomaterial comprising semiconductor nanocrystals and a material capable of transporting charge disposed on a backing member. In certain embodiments, the backing member comprises a film. In certain embodiments, the article further includes a removable sheet disposed over the layer.

In certain embodiments, the composition is deposited in a predetermined arrangement. For example, the composition can be deposited in a patterned or unpatterned arrangement.

In another aspect of the invention there is provided an article of manufacture comprising a layer comprising nanomaterial comprising semiconductor nanocrystals and a material capable of transporting charge reversibly attached to a backing member. In certain embodiments, the backing member comprises a film. In certain embodiments, the article further includes a removable sheet disposed over the layer.

In certain embodiments, the composition is deposited in a predetermined arrangement. For example, the composition can be deposited in a patterned or unpatterned arrangement.

In another aspect of the invention there is provided an article of manufacture comprising a layer comprising nanomaterial comprising semiconductor nanocrystals and a material capable of transporting charge disposed on a removable backing member. In certain embodiments, the backing member comprises a film. In certain embodiments, the article further includes a removable sheet disposed over the layer.

In certain embodiments, the composition is deposited in a predetermined arrangement. For example, the composition can be deposited in a patterned or unpatterned arrangement.

Examples of a donor surface useful in methods and articles in accordance with the present invention include, without limitation, a web, a film, a tape, a flexible sheet, etc. Examples of materials that can be used as a donor surfaces include plastic, foil, paper, etc. The donor surface can include, for example, sheets of material, a roll of material, etc. The donor surface can have different dimensions. In certain embodiments, a donor surface includes Kapton 200E, Kapton 300H, Kapton 500H, PET, TEONEX, silicone treated PET, etc. Preferably, the donor surface is not rigid. In certain more preferred embodiments, the donor surface is flexible.

The foregoing, and other aspects described herein all constitute embodiments of the present invention.

It is to be understood that both the foregoing general description and the following detailed description are exemplary and explanatory only and are not restrictive of the present invention. Other embodiments will be apparent to those skilled in the art from consideration of the specification and practice of the invention disclosed herein.

BRIEF DESCRIPTION OF THE DRAWINGS

In the drawings,

FIG. 1 depicts a schematic of an example of an equipment set-up for use in carrying out an embodiment of a method in accordance with the invention.

The attached FIGURE is a simplified representations presented for purposed of illustration only; the actual structures may differ in numerous respects, including, e.g., relative scale, etc.

For a better understanding to the present invention, together with other advantages and capabilities thereof, reference is made to the following disclosure and appended claims in connection with the above-described drawings.

DETAILED DESCRIPTION OF THE INVENTION

One aspect of the invention relates to methods for depositing nanomaterial.

The nanomaterial can optionally be included in a composition. The composition can further include liquid or other carrier medium. The composition can further include one or more additional components. In certain embodiments, a composition includes a sol-gel, such as a metal oxide sol-gel.

A nanomaterial typically includes nanoparticles having an average maximum dimension smaller than 100 nm.

Examples of nanoparticles include, for example, a semiconductor nanocrystal, a nanotube (such as a single walled or multi-walled carbon nanotube), a nanowire, a nanorod, a dendrimer, or other nano-scale or micro-scale material.

A nanomaterial can include one nanomaterial or a mixture of two or more different nanomaterials. Nanomaterials can be different based on, e.g. chemical composition, physical characteristics, (e.g., particle morphology, size, shape, surface area, particle size distribution, Full Width at Half-Maximum (FWHM), etc.), surface treatment(s) (e.g., not surface-modified, surface modified, and if surface modified, the details of the surface modification (e.g., composition, etc.)), particle structure (e.g., uncoated or coated; and if coated, the details of the coating, e.g., composition, thickness, nature of the coating (e.g., continuous, non-continuous, particulate, film, etc.)), performance characteristics (e.g., absorption properties, emission characteristics, etc.) of each nanomaterial, different combinations of chemical, physical, and/or performance aspects, etc.

In certain embodiments, nanomaterial includes semiconductor nanocrystals. Semiconductor nanocrystals comprise nanometer-scale inorganic semiconductor particles. Semiconductor nanocrystals preferably have an average nanocrystal diameter less than about 150 Angstroms (Å), and most preferably in the range of 12-150 Å.

In the various aspects and embodiments described herein, the composition can optionally further include a material capable of transporting charge. In certain embodiments, the composition comprises a nanomaterial comprising semiconductor nanocrystals, a material capable of transporting charge, and a liquid, wherein the material capable of transporting charge has a triplet energy which is at least greater than the bandgap of the semiconductor nanocrystals included in the composition.

The semiconductor forming the semiconductor nanocrystals can comprise a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, alloys of any of the foregoing, and/or mixtures of any of the foregoing, including ternary and quaternary mixtures and/or alloys. Examples include, but are not limited to, ZnO, ZnS, ZnSe, ZnTe, MgO, MgS, MgSe, MgTe, CdO, CdS, CdSe, CdTe, HgO, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbO, PbS, PbSe, PbTe, Si, Ge, other Group IV elements, and/or mixtures or alloys thereof, including ternary and quaternary mixtures or alloys.

In certain embodiments, semiconductor nanocrystals preferably include a "core" of one or more first semiconductor materials, which may be surrounded by an overcoating or "shell" of a second semiconductor material. A semiconductor nanocrystal core surrounded by a semiconductor shell is also referred to as a "core/shell" semiconductor nanocrystal.

For example, the semiconductor nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as semiconductor nanocrystal cores include, but are not limited to, CdO, CdS, CdSe, CdTe, ZnO, ZnS, ZnSe, ZnTe, MgO, MgS, MgSe, MgTe, GaAs, GaP, GaSb, GaN, HgO, HgS, HgSe, HgTe, InAs, InP, InSb, InN, AlAs, AlP, AlSb, AlS, PbO, PbS, PbSe, Ge, Si, other Group IV elements, and/or mixtures or alloys thereof, including ternary and quaternary mixtures or alloys.

The shell can be a semiconductor material having a composition that is the same as or different from the composition of the core. The shell comprises an overcoat of a semiconductor material on a surface of the core semiconductor nanocrystal can include a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, alloys of any of the foregoing, and/or mixtures of any of the foregoing, including ternary and quaternary mixtures and/or alloys. Examples include, but are not limited to, ZnO, ZnS, ZnSe, ZnTe, CdO, CdS, CdSe, CdTe, MgO, MgS, MgSe, MgTe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Si, Ge, and/or mixtures and/or alloys thereof, including ternary and quaternary mixtures and/or alloys. For example, ZnS, ZnSe or CdS overcoatings can be grown on CdSe or CdTe semiconductor nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating may comprise one or more layers. The overcoating comprises at least one semiconductor material which is the same as or different from the composition of the core. The overcoating can have a thickness of from about one to about ten monolayers. An overcoating can also have a thickness greater than ten monolayers. In certain embodiments, more than one overcoating can be included on a core.

In certain embodiments, the surrounding "shell" material can have a bandgap greater than the bandgap of the core material. In certain embodiments, the shell can be chosen so as to have an atomic spacing close to that of the "core" substrate. In certain embodiments, the surrounding shell material can have a bandgap less than the bandgap of the core material. In a further embodiment, the shell and core materials can have the same crystal structure.

For further examples of core/shell semiconductor structures, see U.S. application Ser. No. 10/638,546, entitled "Semiconductor Nanocrystal Heterostructures", filed 12 Aug. 2003, which is hereby incorporated herein by reference in its entirety.

The semiconductor nanocrystals are preferably members of a population of semiconductor nanocrystals having a narrow size distribution. More preferably, the semiconductor nanocrystals comprise a monodisperse or substantially monodisperse population of semiconductor nanocrystals. The monodisperse distribution of diameters can also be referred to as a size. Most preferably, the monodisperse population of semiconductor nanocrystals exhibits less than a 15% rms deviation in diameter of the nanocrystals, preferably less than 10%, more preferably less than 5%.

Examples of methods of preparing monodisperse semiconductor nanocrystals include pyrolysis of organometallic reagents, such as dimethyl cadmium, injected into a hot, coordinating solvent. This permits discrete nucleation and results in the controlled growth of macroscopic quantities of nanocrystals. Preparation and manipulation of semiconductor nanocrystals are described, for example, in U.S. Pat. Nos. 6,322,901 and 6,576,291, and U.S. Patent Application No. 60/550,314, each of which is hereby incorporated herein by reference in its entirety. Additional examples of methods of preparing semiconductor nanocrystal are described in U.S. patent application Ser. No. 11/354,185 of Bawendi et al., entitled "Light Emitting Devices Including Semiconductor Nanocrystals", filed 15 Feb. 2006, and U.S. patent application Ser. No. 11/253,595 of Coe-Sullivan et al., entitled "Light Emitting Device Including Semiconductor Nanocrystals", filed 21 Oct. 2005, and U.S. patent application Ser. No. 10/638,546 of Kim et al., entitled "Semiconductor Nanocrystal Heterostructures", filed 12 Aug. 2003, referred to above, each of which is hereby incorporated by reference herein in its entirety.

Certain preferred methods of manufacturing a nanocrystal include a colloidal growth process. Colloidal growth occurs by rapidly injecting an M donor and an X donor into a hot coordinating solvent. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened.

The M donor can be an inorganic compound, an organometallic compound, or elemental metal. M is cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, bis(trimethylsilyl) selenide ((TMS)$_2$Se), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride (($TMS)_2Te$), bis(trimethylsilyl)sulfide (($TMS)_2S$), a trialkyl phosphine sulfide such as (tri-n-octylphosphine) sulfide (TOPS), an ammonium salt such as an ammonium halide (e.g., $NH_4Cl$), tris(trimethylsilyl) phosphide (($TMS)_3P$), tris (trimethylsilyl) arsenide (($TMS)_3As$), or tris(trimethylsilyl) antimonide (($TMS)_3Sb$). In certain embodiments, the M donor and the X donor can be moieties within the same molecule.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used. Non-coordinating solvents can also be used.

Size distribution during the growth stage of the reaction can be estimated by monitoring the absorption line widths of the particles. Modification of, e.g., the reaction temperature, injection rates, concentrations) in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

A nanocrystal can be a member of a population of nanocrystals having a narrow size distribution. A nanocrystal can be a sphere, rod, disk, or other shape. A nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

In certain embodiments, semiconductor nanocrystals are optionally surface modified, including, but not limited to, for example, having one or more ligand groups attached thereto.

In one embodiment, the ligands are derived from the coordinating solvent used during the growth process. The surface can be modified by repeated exposure to an excess of a competing coordinating group to form an overlayer. For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a suspension or dispersion medium. Such affinity improves the stability of the suspension and discourages flocculation of the semiconductor nanocrystal. Nanocrystal outer layers are described in U.S. Pat. No. 6,251,303, which is incorporated by reference in its entirety.

More specifically, the coordinating ligand can have the formula:

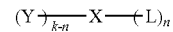

wherein k is 2, 3 or 5, and n is 1, 2, 3, 4 or 5 such that k-n is not less than zero; X is O, S, S=O, $SO_2$, Se, Se=O, N, N=O, P, P=O, As, or As=O; each of Y and L, independently, is aryl, heteroaryl, or a straight or branched $C_{2-12}$ hydrocarbon chain optionally containing at least one double bond, at least one triple bond, or at least one double bond and one triple bond. The hydrocarbon chain can be optionally substituted with one or more $C_{1-4}$ alkyl, $C_{2-4}$ alkenyl, $C_{2-4}$ alkynyl, $C_{1-4}$ alkoxy, hydroxyl, halo, amino, nitro, cyano, $C_{3-5}$ cycloalkyl, 3-5 membered heterocycloalkyl, aryl, heteroaryl, $C_{1-4}$ alkylcarbonyloxy, $C_{1-4}$ alkyloxycarbonyl, $C_{1-4}$ alkylcarbonyl, or formyl. The hydrocarbon chain can also be optionally interrupted by —O—, —S—, —N($R^a$)—, —N($R^a$)—C(O)—O—, —O—C(O)—N($R^a$)—, —N($R^a$)—C(O)—N($R^b$)—, —O—C(O)—O—, —P($R^a$)—, or —P(O)($R^a$)—. Each of $R^a$ and $R^b$, independently, is hydrogen, alkyl, alkenyl, alkynyl, alkoxy, hydroxylalkyl, hydroxyl, or haloalkyl. An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyridyl, pyrrolyl, phenanthryl.

A suitable coordinating ligand can be purchased commercially or prepared by ordinary synthetic organic techniques, for example, as described in J. March, Advanced Organic Chemistry, which is incorporated herein by reference in its entirety. See also U.S. patent application Ser. No. 10/641,292 entitled "Stabilized Semiconductor Nanocrystals", filed 15 Aug. 2003, which is hereby incorporated herein by reference in its entirety. See also the patent applications, which include descriptions of preparation methods that are listed above.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

Nanomaterial particles can have various shapes, including, but not limited to, sphere, rod, disk, other shapes, and mixtures of various shaped particles.

As discussed above, certain embodiments of a composition can include nanomaterial and a liquid or other carrier medium (e.g., liquid, polymer, monomer, polymer or monomer solution, etc.). The carrier medium is preferably liquid in which the nanomaterial does not does not appreciably dissolve, and preferably, not dissolve.

In certain embodiments, the liquid or other carrier medium comprises a composition including one or more functional groups that are capable of being cross-linked by UV or thermal treatment or another cross-linking technique readily ascertainable by a person of ordinary skill in a relevant art.

Examples of a liquid for inclusion in a composition including a nanomaterial (e.g., a nanomaterial comprising semiconductor nanocrystals) and optionally a material capable of transporting charge include, without limitation, those listed in the following Table 1, and mixtures of two or more thereof.

Examples of mixtures include, but are not limited to, hexane and octane; benzene and xylene; tetrahydrofurane and anisole; etc.

TABLE 1

| Liquid | Formula | Viscosity @25° C. | Boiling Point @1 atm | Relative Polarity (compared to water) |
| --- | --- | --- | --- | --- |
| Cyclohexane | $C_6H_{12}$ | 0.89 | 80.7 | 0.006 |
| Pentane | $C_5H_{12}$ | 0.24 | 36.1 | 0.009 |
| Hexane | $C_6H_{14}$ | 0.30 | 69 | 0.009 |
| Heptane | $C_7H_{16}$ | 0.91 | 98 | 0.012 |
| carbon tetrachloride | $CCl_4$ | 0.91 | 76.7 | 0.052 |
| p-xylene | $C_8H_{10}$ | 0.63 | 138.3 | 0.074 |
| toluene | $C_7H_8$ | 0.56 | 110.6 | 0.099 |
| benzene | $C_6H_6$ | 0.60 | 80.1 | 0.111 |
| diethyl ether | $C_4H_{10}O$ | 0.22 | 34.6 | 0.117 |
| methyl t-butyl alcohol | $C_5H_{12}O$ | | 55.2 | 0.148 |
| dioxane | $C_4H_8O_2$ | 1.21 | 101.1 | 0.164 |
| tetrahydrofurane (THF) | $C_4H_8O$ | 0.47 | 66 | 0.207 |
| ethyl acetate | $C_4H_8O_2$ | | 77 | 0.228 |
| dimethoxy-ethane (glyme) | $C_4H_{10}O_2$ | | 85 | 0.231 |
| diglyme | $C_6H_{14}O_3$ | | 162 | 0.244 |
| chloroform | $CHCl_3$ | 0.54 | 61.2 | 0.259 |
| methylene chloride | $CH_2Cl_2$ | 0.43 | 39.8 | 0.309 |
| 2-butanone | $C_4H_8O$ | | 79.6 | 0.327 |
| acetone | $C_3H_6O$ | 0.31 | 56.2 | 0.355 |
| t-butyl alcohol | $C_4H_{10}O$ | | 82.2 | 0.389 |
| dimethyl-formamide (DMF) | $C_3H_7NO$ | | 153 | 0.404 |
| dimethyl sulfoxide (DMSO) | $C_2H_6OS$ | | 189 | 0.444 |
| acetonitrile | $C_2H_3N$ | 0.35 | 81.6 | 0.46 |
| 2-propanol | $C_3H_8O$ | 2.40 | 82.4 | 0.546 |
| 1-butanol | $C_4H_{10}O$ | 3.00 | 117.6 | 0.602 |
| 1-propanol | $C_3H_8O$ | 1.95 | 97 | 0.617 |
| acetic acid | $C_2H_4O_2$ | | 118 | 0.648 |
| ethanol | $C_2H_6O$ | 1.20 | 78.5 | 0.654 |
| diethylene glycol | $C_4H_{10}O_3$ | 35.70 | 245 | 0.713 |
| Methanol | $CH_4O$ | 0.59 | 64.6 | 0.762 |
| ethylene glycol | $C_2H_6O_2$ | 16.90 | 197 | 0.79 |
| glycerin | $C_3H_8O_3$ | 1410.00 | 290 | 0.812 |
| water, heavy ($D_2O$) | $D_2O$ | | 101.3 | 0.991 |
| Water | $H_2O$ | 1.00 | 100 | 1 |

TABLE 1-continued

| Liquid | Formula | Viscosity @25° C. | Boiling Point @1 atm | Relative Polarity (compared to water) |
| --- | --- | --- | --- | --- |
| Nonane | $(CH_3(CH_2)_7CH_3)$ | 0.67 | 39.0 | |
| Decane | $C_{10}H_{22}$ | 0.84 | 174.1 | |
| Dodecane | $C_{12}H_{26}$ | 1.25 | 216.2 | |
| Chlorobenzene | $C_6H_5Cl$ | 0.75 | 132 | |
| Dichlorobenzene | $C_6H_4Cl_2$ | — | 174.0 | |
| Anisole | $C_7H_8O$ | 0.92 | 154.0 | |
| Dimethyl formamide | $HCON(CH_3)_2$ | 0.79 | 149.56 | |
| 1-Methyl-2-pyrrolidinone | | 1.7 | 204.5 | |
| Carbon tetrachloride | $CCl_4$ | 0.91 | 76.8 | |
| 1,1,1-Trichloro-ethane | $CH_3CCl_3$ | 0.73 | 74.0 | |
| Tetrachloroethylene | $ClCH=CCl_2$ | 0.57 | 87.0 | |
| Ethylbenzene | $C_8H_{10}$ | 0.67 | 136.0 | |
| Fluorinert FC-77 (a 3M product) | | 1.3 | 97.0 | |

Other liquids or mixtures of liquids can be included in the composition. In certain embodiments, volatile liquids or mixtures of volatile liquids can be included.

Other liquids or mixtures of liquids can be included in the composition. In certain embodiments, volatile liquids or mixtures of volatile liquids can be included.

In certain embodiments, a composition including nanomaterial, a liquid, and optionally a material capable of transporting charge, has a viscosity in a range of from about 0.1 centipoise (e.g., that of diethyl ether, methanol) to greater than 1500 centipoise (e.g., that of oils, glycerol).

In embodiments including nanomaterial comprising semiconductor nanocrystals, a preferred liquid comprises an organic non-polar solvent. In certain embodiments, the carrier has a viscosity less than or equal to about 1 cP. In certain embodiments, the carrier is selected to have relatively high volatility if carrier removal is desired.

In certain embodiments of the inventions described herein, it is not necessary to have the nanomaterial particles (e.g., semiconductor nanocrystals) individually dispersed in the liquid or other carrier medium. The nanomaterial particles (e.g., semiconductor nanocrystals may be aggregated. In certain embodiments of the inventions described herein, the nanomaterial particles (e.g., semiconductor nanocrystals) may be included within or adsorbed onto polymer particles. In certain embodiments of the inventions described herein, the nanomaterial particles (e.g., semiconductor nanocrystals) may be included within or adsorbed onto a matrix. The matrix can be polymeric or non-polymeric.

Optionally, other components can be included in the composition. Examples of other components that can be optionally included in the composition include, but are not limited to, e.g., surfactants, solvents, co-solvents, buffers, biocides, viscosity modifiers, complexing agents, chelating agents, stabilizing agents (e.g., to inhibit agglomeration of the nanomaterial), humectants, scatterers, fillers, extenders, etc. Other possible components include other additives of the type that may be included in ink or inkjet ink compositions. Stabilizing agents can include, e.g., chemically attached functional groups or ligands to form a coating around individual nanoparticles.

The amount (e.g., concentration (wt/vol)) of nanomaterial included in a composition can be selected based upon the particular nanomaterial and desired attributes of the deposited nanomaterial (e.g., thickness, optical density, features of the deposited nanomaterial (e.g., patterned or unpatterned, sizes of the features of a pattern, etc.). The amount can be readily determined by a person of ordinary skill in the art.

For example, in certain embodiments of compositions including a nanomaterial comprising semiconductor nanocrystals and a liquid (including, e.g., but not limited to, a liquid comprising non-polar organic liquid or liquid mixture), the composition can include at least about 0.1 mg/ml semiconductor nanocrystals. In examples of other embodiments, the composition can include at least 1 mg/ml, at least 5 mg/ml, at least 10 mg/ml, at least 25 mg/ml; at least 50 mg/ml, etc.

In certain embodiments, the composition further comprises a material capable of transporting charge, and any other optional components.

A nanomaterial includes nanoparticles having an average maximum dimension smaller than 100 nm.

In certain preferred embodiments, the nanomaterial comprises semiconductor nanocrystals.

In certain preferred embodiments, the nanomaterial and any other optional solid components are colloidally dispersed in the composition when introduced onto the transfer surface.

Methods in accordance with the invention allow deposition of one or more nanomaterials. The nanomaterial can be deposited as a layer which can be patterned or unpatterned.

Methods in accordance with the invention are particularly useful for applying one or more nanomaterials to a predefined region of a donor surface, transfer surface, and/or substrate, which may optionally include other materials, layers, components, and/or structures disposed thereon.

The predefined region is a region on the substrate where the nanomaterial is selectively applied. The nanomaterial and surface can be chosen such that the nanomaterial remains substantially entirely within the predetermined area. Nonmaterial can be applied to the donor surface such that the nanomaterial forms an unpatterned layer of nanomaterial within the predetermined area or a pattern of nanomaterial within the predetermined area. The pattern can be a regular pattern (such as an array, or a series of lines), or an irregular pattern.

Once one or more nanomaterials are applied to the surface, the surface can have a region including the nanomaterial (the predefined region) and a region substantially free of nanomaterial. In some circumstances, the one or more nanomaterials are deposited onto on the substrate at a thickness of about a monolayer. The predefined region can be a discontinuous region. In other words, when the one or more nanomaterials are applied to the predefined region of the substrate, locations including nanomaterial can be separated by other locations that are substantially free of nanomaterial.

See, for example, A. Kumar and G. Whitesides, Applied Physics Letters, 63, 2002-2004, (1993); and V. Santhanam and R. P. Andres, Nano Letters, 4, 41-44, (2004), each of which is incorporated by reference in its entirety. See also U.S. patent application Ser. No. 11/253,612, filed 21 Oct. 2005, entitled "Method And System For Transferring A Patterned Material", of Co-Sullivan et al. and U.S. patent application Ser. No. 11/253,595, filed 21 Oct. 2005, entitled "Light Emitting Device Including Semiconductor Nanocrystals," of Coe-Sullivan, each of which is incorporated herein by reference in its entirety.

When deposited in a patterned arrangement, features including a nanomaterial and can be deposited in a pattern including features having at least one dimension at a micron-scale (e.g., less than 1 mm, less than 500 µm, less than 200 µm, less than 100 µm or less, less than 50 µm or less, less than 20 µm or less). Features including a nanomaterial can also be deposited in a patterned arrangement comprising features at greater than micron-scale.

When deposited in a patterned arrangement, features including a nanomaterial and a material capable of transporting charge can be deposited in a pattern including features having at least one dimension at a micron-scale (e.g., less than 1 mm, less than 500 µm, less than 200 µm, less than 100 µm or less, less than 50 µm or less, less than 20 µm or less). Features including a nanomaterial and a material capable of transporting charge can also be deposited in a patterned arrangement comprising features at greater than micron-scale.

A pattern comprising features on the micron scale may also be referred to herein as a micropattern. A micropattern can have features on the micron scale, such as less than 1 mm, less than 500 µm, less than 200 µm, less than 100 µm, less than 50 µm, or 20 µm or less in size. A 20 µm feature size is sufficiently small for most light emitting devices and devices for other applications.

The surface on which a composition can be deposited can have dimensions of 1 cm or greater, 10 cm or greater, 100 cm or greater, or 1,000 cm or greater.

Methods in accordance with the invention are scalable and can be useful in depositing a pattern comprising one or more nanomaterials over a wide range of surface areas.

For example, the method is useful for depositing nanomaterial over very small areas (for example, 100 µm catheters) to very large areas, (for example, 12" square areas). In further example, the method is also useful for depositing nanomaterial over surfaces with dimensions such as GEN2 (360 mm×465 mm), GEN3 (550 mm×650 mm), GEN3.5 (600 mm×720 mm), GEN4 (730 mm×920 mm), GEN5 (1110 mm×1250 mm), GEN6 (1500 mm×1800 mm), GEN7 (1900 mm×2100 mm), and subsequent generations of glass that can be used, e.g., in displays. Optionally, areas onto which nanomaterial is applied can then be stitched (or tiled) together, to expand the printable area from 12" squares, to 'n×12" squares' as is frequently done in the semiconductor lithography field.

Devices fabricated in accordance with embodiments of the invention may be incorporated into a wide variety of consumer products, including flat panel displays, computer monitors, televisions, billboards, lights for interior or exterior illumination and/or signaling, heads up displays, fully transparent displays, flexible displays, laser printers, telephones, cell phones, personal digital assistants (PDAs), laptop computers, digital cameras, camcorders, viewfinders, micro-displays, vehicles, a large area wall, theater or stadium screen, or a sign. Various control mechanisms may be used to control devices fabricated in accordance with the present invention, including passive matrix and active matrix.

In one aspect of the invention there is provided a method of depositing nanomaterial onto a donor surface. The method comprises applying a composition comprising nanomaterial and liquid onto a donor surface and removing liquid from the composition disposed on the donor surface. Preferably all or substantially all of the liquid is removed from the composition.

In another aspect of the invention there is provided a method of depositing a nanomaterial onto a substrate. The method comprises applying a composition comprising nanomaterial onto a donor surface, and depositing at least a portion of the composition disposed on the donor surface onto the substrate.

In another aspect of the invention there is provided a method of depositing nanomaterial onto a substrate. The method comprises applying a composition comprising nanomaterial and liquid onto a donor surface from a micro-dispenser, and depositing at least a portion of the composition onto the substrate.

In another aspect of the invention there is provided a method of depositing nanomaterial onto a substrate. The method comprises applying a composition comprising nanomaterial and liquid onto a donor surface from a micro-dispenser, and removing liquid from the composition disposed on the donor surface before depositing at least a portion of the substantially liquid-free composition onto the substrate. Preferably all of the liquid is removed from the composition.

In another aspect of the invention there is provided a method of depositing nanomaterial onto a substrate. The method comprises applying a composition comprising nanomaterial onto a donor surface from a micro-dispenser, transferring at least a portion of the composition disposed on the donor surface to a transfer surface, and depositing at least a portion of the composition disposed on the transfer surface onto the substrate.

In another aspect of the invention there is provided a method of depositing nanomaterial onto a substrate. The method comprises applying a composition comprising nanomaterial and liquid onto a donor surface from a micro-dispenser; removing liquid from the composition disposed on the donor surface before transferring at least a portion of the substantially liquid-free composition to a transfer surface; and depositing at least a portion of the substantially liquid-free composition disposed on the transfer surface onto the substrate.

In another aspect of the invention there is provided a method of depositing nanomaterial onto a substrate. The method comprises applying a composition comprising nanomaterial and liquid onto a donor surface from a micro-dispenser; transferring at least a portion of the composition disposed on the donor surface to a transfer surface; and removing liquid from the composition disposed on the transfer surface before depositing at least a portion of the substantially liquid-free composition from the transfer surface onto the substrate.

In another aspect of the invention there is provided a method for depositing nanomaterial onto a substrate. The method comprises: providing a substrate; providing a film including a layer comprising nanomaterial disposed on a side thereof, contacting the layer comprising nanomaterial to the substrate under conditions to cause the layer comprising nanomaterial to deposit onto the substrate. In certain embodiments, the layer also comprises a material capable of transferring charge.

In another aspect of the invention there is provided a method for depositing nanomaterial to a substrate. The method comprises: providing a substrate; providing a film including a layer comprising nanomaterial disposed on a side thereof, contacting the layer comprising nanomaterial to a transfer surface under conditions to cause the layer comprising nanomaterial to deposit on the transfer surface; removing at least a portion of the nanomaterial disposed on the transfer surface, and depositing nanomaterial and the material capable of transferring charge onto the substrate. In certain embodiments, the layer also comprises a material capable of transferring charge.

In a detailed aspect, the method can optionally further include removing the film from the layer of nanomaterial deposited on the surface.

In the various aspects of the invention including a transfer surface, the nanomaterial can be selectively removed from the transfer surface in a predetermined pattern to be deposited on the substrate.

In certain embodiments, for example, the nanomaterial can be removed from the transfer surface in a predetermined pattern by a patterned applicator (e.g., stamp, roller, etc.) with features (elevations and/or depressions) on the applicator surface corresponding to the predetermined pattern. In certain embodiments, a first pattern of material can be removed by a first applicator and the subtractive pattern of nanomaterial disposed on the transfer surface can be picked up by a second applicator and deposited onto the substrate.

In certain embodiments, for example, a predetermined pattern can be deposited onto the substrate by including features (elevations and/or depressions) corresponding to the predetermined pattern on all or a portion of the transfer surface. The nanomaterial disposed on the elevated features of the transfer surface can be picked up with an applicator in the predetermined pattern and deposited on the substrate.

In certain embodiments, for example, a predetermined pattern can be formed on the transfer surface by placing a mask including apertures corresponding to the predetermined pattern on the transfer surface before the nanomaterial is deposited. The nanomaterial will be deposited on the transfer surface through the apertures arranged in the determined pattern. After the mask is removed, the patterned nanomaterial deposited onto transfer surface through the apertures can be picked up by an applicator, preferably with an unfeatured surface, and deposited onto the substrate.

In certain embodiments, two or more patterns of different nanomaterials can be separately deposited onto the surface to provide a predetermined pattern. As discussed above, the pattern of each nanomaterial is separately deposited and can be aligned by known techniques.

Embodiments of the invention including deposition predetermined patterns of two or more nanomaterials is useful for depositing two or more nanomaterials comprising semiconductor nanocrystals for example, in making light-emitting devices, displays, non-volatile memory devices, and other applications including two or more nanomaterials including semiconductor nanocrystals in a predetermined pattern.

As discussed above, the surface of the applicator can further be surface modified to enhance the attachment and release of nanomaterial from the surface.

In other embodiments, the nanomaterial is removed form the transfer surface as unpatterned layer to be deposited on the substrate.

In accordance with various aspects and embodiments of the inventions described herein, a composition comprising nanomaterial and liquid can be applied to a donor surface from a micro-dispenser.

In certain embodiments, the composition can be deposited from a micro-dispenser, such as an inkjet print head of an inkjet printing system. Inkjet printing can allow a pattern of the composition to be conveniently formed on a layer of a device. Inkjet printing can allow precise control over the location and size of inked areas that are printed. Composition spots of about 20 µm in size are readily achievable today by commercially available inkjet printers, and smaller spot sizes are expected to be possible. Different nanomaterials can be patterned simultaneously using an inkjet printing system having multiple print heads. Thus, multiple nanomaterials can be deposited in a single deposition step. This avoids the need to register subsequent depositions to a previously deposited pattern.

An inkjet printing system for use in depositing a composition comprising a nanomaterial (e.g., semiconductor nanocrystals) and a liquid can include a printhead having a firing chamber reservoir containing the composition or ink. In one embodiment, an inkjet printing system, for example, can be used to propel the composition onto the donor sheet using resistive heating elements or piezoelectric elements for propelling the composition through an overlying orifice plate. The composition can be stored in a reservoir and the composition can travel through a set of micro-channels toward the orifice plate. The printhead can have a firing chamber reservoir containing the ink. In certain embodiments, the composition can further include a material capable of transporting charge.

Examples of inkjet printing systems for use in carrying out the methods of the invention include, without limitation, Dimatix Materials Printer DMP-2800 Series including Dimatix Materials Cartridge DMC-1000 Series, of Dimatix, Inc., Santa Clara, Calif. Inkjet printing systems from other manufacturers may also be useful in carrying out the methods of the invention. See also inkjet printing systems described in U.S. Pat. No. 6,997,539 for "Apparatus for Depositing propllets" of Hoisington et al. (assigned to Dimatix, Inc.), issued on 14 Feb. 2006; U.S. Pat. No. 7,011,936 for "Piezoelectric Ink Jet Module With Seal" of Moynihan et al. (assigned to Dimatix, Inc.), issued on 14 Mar. 2006. The foregoing patents are hereby incorporated herein by reference in their entirety. Examples of other inkjet printing systems include the Omnidot printer available from the Xaar Corporation headquartered in Cambridge, UK. Another example of a nozzle array is a multi-jet nozzle system that includes 126 jets and is sold under the part number XJ126 by Xaar Corporation. Furthermore, an atomization spray process using an ultrasonic spray head to dispense composition droplets may be employed. Additionally, for inks with high viscosities, e.g., 20 centipoise or greater, the Leopard available from the Xaar Corporation may be employed, wherein the composition may be heated to reduce the viscosity to a jettable range.

An example of another inkjet system which is more suitable to research and development needs is the Active Pipette™ piezo system available from Engineering Arts.

An inkjet printing system can include, for example, a data interface, a control subsystem, a positioning subsystem, and a depositing subsystem. It should be appreciated that in other embodiments of the invention, a composition including a nanomaterial comprising semiconductor nanocrystals and a liquid may be deposited onto a donor sheet layer by any of a variety of other delivery systems including one or more micro-dispensers, including but not limited to thermal ejection, piezoelectric ejection, aerosol generation, micropipettes, pipettes, ultrasonic printheads, etc. that can be configured to dispense a selected volume of solution with the desired application parameters.

Current inkjet technology allows for orifice sizes of from about 15 µm to about 100 µm. Thus, the minimum size of the features that can be deposited is currently limited to about this range, although future developments may allow for smaller orifice sizes and decreased sizes. Additionally, the size of the orifice can affect the practical size of any nanomaterial present in the composition to be inkjetted.

In certain embodiments, inkjetting techniques can include a composition formulation which is tailored to various inkjet pens, including thermal, piezoelectric, sonic impulse, or other known inkjet printing systems. As discussed above, a composition can include a variety of components such as those typically used in inkjet liquids, such as, but not limited to solvents, cosolvents, surfactants, biocides, buffers, viscosity modifiers, sequestering agents, colorants, stabilizing agents, humectants, scatterers, fillers, extenders, water, and mixtures thereof. Several considerations in selecting the amount of liquid include those related to nucleation such as heat capacity, heat of vaporization, critical nucleation temperature, diffusivity, and the like. Typically, an ink or composition for use in thermal inkjet printing systems can have a viscosity of from about 0.8 cP to about 20 cP, and in some cases, can be up to 50 cP. Similarly, an ink or composition for use in piezoelectric inkjet printing systems can have a viscosity of from about 2 cP to about 15 cP, and in some cases, can be up to 30 cP. Optionally, a viscosity modifier can be included in the composition to be inkjetted. Examples of viscosity modifiers include 2-pyrrolidone, isopropyl alcohol, glycerol, and the like. However, other viscosity modifiers can be used.

The surface tension of an ink or composition used in thermal inkjet printing systems can range from about 25 dyne/cm to about 75 dyne/cm, and in some embodiments, can be from about 30 to about 55 dyne/cm. The surface tension can be adjusted using compounds such as isopropyl alcohol, ethanol, methanol, glycerol, and the like. In certain embodiments, the liquid can include from about 60 wt % to about 100 wt % of the composition to be inkjetted. Various techniques can be used to modify the viscosity or other jetting properties of the composition. For example, heat can be used to liquefy material, increase solubility of the material, or reduce viscosity such that it becomes inkjettable. Those skilled in the art will recognize that the above discussion is primarily focused on thermal inkjet printing systems; piezoelectric inkjet printing systems involve less restrictive considerations. For example, thermal inkjet printing systems are typically operated at temperatures below about 80° C., while piezoelectric inkjet printing systems can be operated at temperatures of up to about 150° C. Those skilled in the art will recognize which components can be included in the liquid in order to inkjet a composition from thermal, piezoelectric, or other inkjet printing systems. Those skilled in the art can adjust these and other variables to achieve a variety of resolutions and conductive paths. Printhead waveforms (e.g., piezo and thermal excitation waveforms, anti-clogging waveforms, ejection waveforms, etc.), and the compositions of the materials used to construct the printhead and orifice plate are among such variables. For example, depending on the wetting attributes of the composition to be inkjetted and the wettability of the internal surface of the inkjet nozzle or the surface of the printing orifice plate, the composition can be treated to enhance drop ejection.

In certain embodiments of the inventions described herein, it may be beneficial to use a vehicle system which would result in ink properties falling outside the normal ranges described above. This would be the case, for example, if one were to use a vehicle in which the material of the device is insoluble. An example of a class of solvents that meet this criterion are fluorinated solvents, such as perfluorodecalin, or the Fluorinert series of solvents sold by 3M. In creating inks from such solvents, the surface tension and viscosity may fall below those normally required for inkjet. Fluorinert FC-77, for example, has a surface tension of 13 dyne/cm and a viscosity of 1.3 cP. A method to more consistently jet inks made with these solvents includes creating a negative pressure (relative to atmospheric) inside the cartridge reservoir to form a jet that is more stable. This can be accomplished at laboratory scale by placing the cartridge reservoir slightly below the inkjet nozzle. The positioning of the cartridge reservoir to achieve a sufficient negative pressure therein to form a jet can be readily determined by one of ordinary skill in the art. Preferably, the inkjet cartridge reservoir is held by or positioned relative to the inkjet nozzle(s) such that the height of inkjet cartridge reservoir can be adjusted to obtain the desired negative pressure inside the cartridge reservoir. In one example, the cartridge reservoir is positioned on a variable-height platform (e.g., a small jack), the height of which can be adjusted to obtain a=negative pressure inside the cartridge reservoir, preferably a slight negative pressure. A schematic diagram of an example of a laboratory-scale set-up is shown in FIG. 1. In certain embodiments, semiconductor nanocrystals included in a fluorinated solvent include one or more fluorinated ligands attached to a surface of the nanocrystals. Nanocrystals including fluorinated ligands can be prepared by exchanging at least one or more ligands that become attached to a nanocrystal surface during, e.g., colloidal synthesis, with ligands that include a functional head such as, by way of example, a thiol, carbodithioate, carbodithioic acid, amine, thiourea, amide, phosphine oxide, phosphonic or phosphinic acid, thiophosphonic or thiophosphinic acid, which functional head can be substituted with alkyl and/or aryl units that are perfluorinated or partially fluorinated. Preferably the fluorinated ligand is chemically compatible with the fluorinated liquid vehicle.

Deposition of nanomaterial onto the donor surface to be printed in the form of ejected drops produces a "dot" of comprising a nanomaterial, other optional components, and liquid thereon. The term "dot" is used to refer to the inkjetted drop once it contacts the surface. In some examples, the drop will stay in a thin layer on the surface. However, depending on the porosity, wettability, and/or or other attributes of the donor, and when the drop contacts the donor surface, the drop of inkjetted composition can spread outwardly resulting in dot gain. Dot gain is the ratio of the final diameter of a dot on the surface to its initial diameter. If the donor surface onto which the composition is deposited is porous, the dot can penetrate into the donor surface. Dot penetration is the depth that the drop soaks into the surface on which it is deposited. The physical and/or chemical properties of the dots can enhance dissolution rates without disrupting the permeability and specificity of the inkjetted composition Controlled dot placement, high surface-to-mass ratio of the dots, and digital mass deposition control of the dots can be used to address performance of the deposited nanomaterial in its intended end-use application.

For example, a dot has virtually no dot gain or dot penetration, as may be the case, when an ejection solution is applied to a delivery substrate having a nonwettable, surface, or a relatively impermeable surface.

One convenient way of quantifying the nature of the interaction between the composition forming the dot and the surface onto which it is deposited, is to measure the angle $\theta$ formed by the liquid-solid and the liquid-air interfaces. This angle, referred to as the contact angle, is a product of the surface tension of the solution as well as the wettability of the surface onto which the composition is deposited. Inks including a liquid having a high surface tension, and poor interaction with the surface of the device layer to be printed tend to exhibit contact angles greater than 90°. The composition then tends to form discrete droplets on the surface. However, where the liquid is relatively nonpolar, as is typically the case with an organic liquid, and the surface onto which the composition is deposited device layer is similarly nonpolar, the contact angle is typically less than 90°, and the liquid tends to spread out and form a thin film. As the dot spreads out and thins, the contact angle tends to zero.

As described above, an inkjet printing system may be adapted to deposit one or more different compositions comprising nanomaterials comprising different semiconductor nanocrystals, which may be included in corresponding inks. In certain embodiments, a material capable of transporting charge can be included in each composition. The material capable of transporting charge in each of the compositions can be the same or different. In certain embodiments, two or more ejection cartridges can be configures for each to deposit a composition including a different nanomaterial and/or eject composition having different drop volumes. The inkjet system may be configured to interchangeably receive different ejection cartridges, which are individually configured to apply the same of different composition to the surface being printed. Interchangeable ejection cartridges may also be used to replace an empty ejection cartridge with a full ejection cartridge. It is within the scope of this disclosure to utilize other mechanisms for depositing a composition including a nanomaterial and a liquid onto a donor surface, and ejection cartridge is provided as a nonlimiting example. For example, an inkjet system may include an ejection cartridge that utilizes an ejection-head having ejectors configured to effectuate fluid ejection via a nonthermal mechanism, such as vibrational displacement caused by a piezoelectric ejection element.

In one example of an inkjet system that may be useful in carrying out methods in accordance with the invention, the nozzle spacing can be about 504 µm, the nozzle diameter can be about 27 µm; and the droplet size (for 12 µl) spreads to minimum size ~5 µm square.

Based on estimated nozzle life, a nozzle can be expected to coat an area of about 807 ft2. This area corresponds to printing 29,000 two-inch squares or 3,200 six inch square displays. The range of fluid viscosities that can be inkjet printed includes, for example, 8-14 cP. Printing at operating temperatures over 70° C. may be limited by the specific materials and equipment used.

Depending upon the drop volume, contact angle, viscosity, and other properties of the composition to be inkjetted, even with a drop volume as small as ~8 µl, the spot diameter can be relatively large due to rapid spreading. Similarly, depending upon the drop volume, contact angle, and viscosity, and other properties of the composition to be inkjetted, in some instances, to print a linear pattern from an inkjet printing system, repeat printing of drops in an overlapping arrangement may be appropriate.

As discussed above, a composition useful for depositing nanomaterial from a micro-dispenser includes nanomaterial and a liquid. In certain embodiments, the composition can further include a material capable of transporting charge. In certain embodiments, the composition includes a material capable of transporting charge having a triplet energy which is at least greater than the bandgap of the semiconductor nanocrystals included in the ink.

In certain embodiments, the liquid comprises a liquid in which the nanomaterial can be dispersed or suspended. In certain preferred embodiments, the nanomaterial is colloidally dispersed. In certain embodiments, the liquid comprises a liquid in which the nanomaterial does not dissolve or does not appreciably dissolve (e.g., solubility is less than 0.001 mg/ml).

In certain embodiments including a nanomaterial including one or more ligands attached to a surface of at least a portion of the nanoparticles thereof, the liquid comprises a liquid in which such nanomaterial with attached ligands can be dispersed or suspended. In certain preferred embodiments, the nanomaterial is colloidally dispersed. In certain embodiments, the nanoparticles comprise semiconductor nanocrystals. In certain embodiments, the liquid is one in which the ligands (when not attached to nanoparticles) are at least partially soluble. In certain embodiments, the liquid is one in which the ligands (when not attached to nanoparticles) are insoluble.

In certain embodiments including a composition comprising a nanomaterial and a liquid, the composition has a viscosity in a range of from about 0.1 centipoise (e.g., that of diethyl ether, methanol) to greater than 1500 centipoise (e.g., that of oils, glycerol).

In certain embodiments including a composition comprising a nanomaterial, a material capable of transporting charge, and a liquid, the composition has a viscosity in a range of from about 0.1 centipoise (e.g., that of diethyl ether, methanol) to greater than 1500 centipoise (e.g., that of oils, glycerol).

Examples of a material capable of transporting charge that can be included in the composition include any material that can be used in a hole transport layer, an electron transport layer, a hole injection layer, or an electron injection layer included light-emitting devices, photodetectors, solar cells, etc. including semiconductor nanocrystals.

In certain embodiments, the composition includes a material capable of transporting charge having a triplet energy which is at least greater than the bandgap of the semiconductor nanocrystals included in the composition.

The amount (e.g., concentration (wt/vol)) of material capable of transporting charge that can be optionally included in a composition can be selected based upon the particular material, nanomaterial and desired attributes of the deposited nanomaterial and material capable of transporting charge (e.g., thickness, optical density, features of the deposited nanomaterial (e.g., patterned or unpatterned, sizes of the features of a pattern, etc.)). The amount can be readily determined by a person of ordinary skill in the art.

For example, a material capable of transporting charge can be included in the composition in an amount of, for example, about 0.1 mg/ml to about 50 mg/ml; about 1 mg/ml to about 20 mg/ml; about 5 mg/ml to about 15 mg/ml.

In certain embodiments, the material capable of transporting charge included in a composition is at least partially soluble in the liquid. In certain embodiments including a nanomaterial comprising semiconductor nanocrystals at least a portion of which have one or more ligands attached to a surface thereof, the ligands and material capable of transporting charge can be chemically similar such that they do not readily separate in the liquid due to chemical dissimilarities. In certain embodiments including a nanomaterial comprising semiconductor nanocrystals including one or more ligands attached to a surface of at least a portion of the semiconductor nanocrystals, the ligands and material capable of transporting charge can be chemically dissimilar such that they separate into layers or phases in the liquid due to chemical dissimilarities.

In certain embodiments, a composition can be deposited from a micro-dispenser at a thickness of multiple monolayers or less. For example, the thickness can be greater than three monolayers, three or less monolayers, two or less monolayers, a single monolayer, a partial monolayer, etc. The thickness of the composition deposited may be varied. In certain embodiments, the variation of the thickness at any point of the deposited composition is less than three monolayers, less than two monolayers, or less than one monolayer. When deposited as a single monolayer, preferably at least about 60% of the nanomaterial (e.g., semiconductor nanocrystals) are at single monolayer thickness, more preferably, at least about 80% of the nanomaterial is at single monolayer thickness, and most preferably, at least about 90% of the nanomaterial is at single monolayer thickness. In a light-emitting device, a monolayer can provide the beneficial light emission properties of semiconductor nanocrystals while minimizing the impact on electrical performance. The inclusion of a material capable of transporting charge in the composition including semiconductor nanocrystals can further improve the light emission properties of the semiconductor nanocrystals while also having a beneficial affect on electrical performance Examples of a donor surface include a web, a film, a tape, a flexible sheet, etc. Examples of materials that can be used as a donor surfaces include plastic, foil, paper, etc. The donor surface can include, for example, sheets of material, a roll of material, etc. The donor surface can have different dimensions. In certain embodiments, a donor surface includes Kapton 200E, Kapton 300H, Kapton 500H, PET, TEONEX, silicone treated PET, etc. Preferably, the donor surface is not rigid. In certain more preferred embodiments, the donor surface is flexible. The selection of the donor surface can depend upon the equipment being used in carrying out the method. In certain embodiments, the materials can have a thickness, from 1.6 micron to 175 micron. In certain embodiments, the donor surface can be treated (e.g., by application of one or more coatings, is otherwise surface modified (e.g., chemical modification of the surface, etc.). For example, a surface chemistry layer is disposed on the donor surface. A surface chemistry layer can be applied by physical vapor deposition (PVD), chemical vapor deposition (CVD), or liquid or gas phase coating by a self-assembled monolayer, depending on the desired material surface properties. In certain embodiments, the donor surface can be treated (e.g., by application of one or more coatings, is otherwise surface modified (e.g., chemical modification of the surface, etc.).

As discussed above, in various embodiments of the invention which include a composition including nanomaterial and liquid, the liquid can be removed from the composition before transfer or removal from the donor surface.

Alternatively, if a composition includes liquid, the liquid can be removed from the composition after the composition is applied to the donor surface. This allows the nanomaterial and any optional non-liquid components of a composition to be deposited onto the substrate by a dry (e.g., liquid-free or substantially liquid-free) transfer. A method including a dry transfer of nanomaterials onto the substrate can be advantageous when liquid included in a composition can dissolve or otherwise react with the substrate onto which the nanomaterials is to be deposited from the donor surface.

In embodiments including a transfer surface, liquid can be removed from the composition before being deposited onto the transfer surface or after being deposited onto the transfer surface. Alternatively, the liquid is removed after the composition is removed from the transfer surface, e.g., on the applicator surface, or after the composition is deposited onto the substrate.

A dry transfer process is preferred, for example, when transferring a composition including semiconductor nanocrystals from an applicator to an organic layer of a light-emitting device structure during device fabrication.

If interaction between the substrate and the liquid is not a concern, the composition can be deposited onto the substrate without prior removal the liquid therefrom. The liquid can be removed after deposition of the composition(s) onto the substrate.

If a wet transfer is desired, and the liquid is appreciably volatile at ambient conditions, the time between application of composition(s) to the applicator surface and deposition thereof onto the substrate is controlled to allow the deposition to occur while the composition(s) includes at least an amount of liquid.

In certain embodiments, the composition (whether including or not including liquid) can be selectively removed from the donor sheet, the transfer sheet, and/or the substrate with an applicator. A stamp comprising an elastomer material is particularly advantageous for depositing nanomaterial comprising, e.g., semiconductor nanocrystals, to a surface. The range of properties of various elastomer materials facilitates selection of an applicator having a predetermined hardness (durometer) which affects the force that can be applied as well as the compression of the stamp.

In certain embodiments, the applicator can have a surface that is featureless or smooth (e.g. without patterned depressions and elevations). A featureless applicator surface can be planar or contoured (e.g., convex, pyramidal, conical, etc.). In certain embodiments, the applicator surface can include features formed by elevations and depressions on the surface, e.g., a pattern of elevations and depressions. The featured applicator surface can further be planar or contoured (e.g., convex, pyramidal, conical, etc.)

A contoured applicator can be useful for providing higher fidelity printing and reduction of trapped gas (i.e. air, nitrogen) bubbles between the receiving surface and the applicator during the deposition of the patterned nanomaterial.

Examples of an applicator can include, without limitation, a surface of a stamp, a roller, etc. Preferably, the applicator has a predetermined dimension so that a pattern can be formed by one time transfer, even, for example, in case of a display device having a large area by using an applicator corresponding to a selected area of the display device.

In certain embodiments, the method can include a donor surface, transfer surface and/or applicator having a modified surface. Modifying a surface of the donor surface, transfer surface and/or the applicator can include, e.g., applying one or more coatings to the surface to modify the properties (e.g., chemical, surface energy, etc.) thereof.

For example, a surface chemistry layer can be applied by physical vapor deposition (PVD), chemical vapor deposition (CVD), or liquid or gas phase coating by a self-assembled monolayer, depending on the desired material surface properties. The composition of the surface chemistry layer is selected to readily adhere and release the composition, in a wet transfer, or nanomaterial, in a dry transfer. The surface chemistry layer can optionally act as a barrier to stamp swelling by the carrier medium for the nanomaterial of the composition, and an adhesion/surface chemistry layer for the composition or nanomaterial. Aromatic organic polymers, deposited by chemical vapor deposition, can be used as a surface chemistry layer. See, for example, S. Coe-Sullivan, et al., Advanced Functional Materials, 15, 1117-1124 (2005), which is incorporated by reference in its entirety. Application of the surface chemistry layer by chemical vapor deposition can result in a conformal coating of the shaped stamp. The surface chemistry layer can be chosen to be compatible with spreading of the composition which includes nanomaterial and liquid. For example, with liquid comprising chloroform, the surface chemistry layer can be a chemical vapor deposited Parylene-C layer. The Parylene-C layer can be, for example, 0.1 to 2 μm thick, depending on the pattern to be reproduced.

Including a surface chemistry layer comprising Parylene-C on the surface of an applicator advantageously enables complete release of the nanomaterial from the surface thereof. Parylene-C further is compatible with a wide range of liquids (e.g., non-polar organic liquids). Parylene-C is an aromatic polymer that can form thin and conformal coatings exhibiting highly inert properties.

The above properties of Parylene-C make it a preferred surface chemistry layer for use in depositing nanomaterials comprising semiconductor nanocrystals, particularly when deposited in thin layers including same.

Removal of composition disposed on the donor surface after removal of the liquid can improve the efficiency of transfer by avoiding possible spreading or wetting of the composition on the applicator surface due to the presence of liquid.

As discussed above, in accordance with another aspect of the invention, a method of depositing nanomaterial onto a substrate includes applying a composition comprising nanomaterial onto a donor surface, transferring at least a portion of the composition disposed on the donor surface to a transfer surface, and depositing at least a portion of the composition from the transfer surface onto the substrate.

As discussed above, in certain embodiments, the composition includes nanomaterial and liquid.

When liquid is further included in the composition, the liquid can optionally be removed before transfer of the composition disposed on the donor surface or after transfer to the transfer surface (if a transfer surface is used), but before deposition of the liquid-free or substantially liquid-free composition onto the substrate.

In certain embodiments, removal of liquid is minimized during transfer of at least a portion of the composition disposed on the donor surface to the transfer surface and in a subsequent deposition onto a substrate.

The transfer surface can be a planar surface. In certain embodiment, the embodiment can be rigid. In certain embodiments, the transfer surface can be flexible. The transfer surface can be glass, plastic, metal, etc. Preferably the surface of the transfer surface is treated (e.g., by application of one or more coatings, is otherwise surface modified (e.g., chemical modification of the surface, surface energy modification etc.). For example, a surface chemistry layer is disposed on the transfer surface. A surface chemistry layer can be applied by physical vapor deposition (PVD), chemical vapor deposition (CVD), or liquid or gas phase coating by a self-assembled monolayer, depending on the desired material surface properties. In certain embodiments, the donor surface can be treated (e.g., by application of one or more coatings, is otherwise surface modified (e.g., chemical modification of the surface, etc.). Examples of surface chemistry treatments that can be used for transfer surfaces include those listed above in the discussion of surface modifications of applicator surfaces.

In embodiments of the invention which include transfer of composition (with or without liquid) to a transfer surface, the transfer surface is preferably in close proximity to the donor surface.

In certain embodiments, at least a portion of the composition is disposed on the transfer surface can be applied to the transfer surface or substrate by contacting the donor surface including the composition (whether including or not including liquid) with adequate pressure to transfer the composition thereto.

In certain embodiments, at least a portion of the composition (whether including or not including liquid) is transferred from the transfer surface onto an applicator and thereafter deposited onto the substrate.

The applicator can have a surface that is featureless or smooth (e.g. without patterned depressions and elevations). A featureless applicator surface can be planar or contoured (e.g., convex, pyramidal, conical, etc.). In certain embodiments, the applicator surface can include features formed by elevations and depressions on the surface, e.g., a pattern of elevations and depressions. The featured applicator surface can further be planar or contoured (e.g., convex, pyramidal, conical, etc.)

A contoured applicator can be useful for providing higher fidelity printing and reduction of trapped gas (i.e. air, nitrogen) bubbles between the receiving surface and the applicator during the deposition of the patterned nanomaterial.

Examples of an applicator can include, without limitation, a surface of a stamp, a roller, etc. Preferably, the applicator has a predetermined dimension so that a pattern can be formed by one time transfer, even, for example, in case of a display device having a large area by using an applicator corresponding to a selected area of the display device.

In certain embodiments, the surface of the applicator can be treated (e.g., by application of one or more coatings, is otherwise surface modified (e.g., chemical modification of the surface, etc.).

In one aspect of the invention there is provided an article of manufacture comprising nanomaterial disposed on a backing member. In a detailed aspect of the invention, the backing member comprises a film. In certain embodiments, the article of manufacture comprises a nanomaterial and a material capable of transporting charge disposed on a backing member.

In another aspect of the invention there is provided an article of manufacture comprising nanomaterial reversibly attached to a backing member. In a detailed aspect of the invention, the backing member comprises a film. In certain embodiments, the article of manufacture comprises a nanomaterial and a material capable of transporting charge reversibly attached to a backing member.

In another aspect of the invention there is provided an article of manufacture comprising nanomaterial disposed on a removable backing member. In certain embodiments, the article of manufacture comprises a nanomaterial and a material capable of transporting charge disposed on a removably backing member. In a detailed aspect of the invention, the backing member comprises a film.

In another aspect of the invention there is provided a method of depositing a layer comprising nanomaterial onto a donor surface. The method comprises applying a coating including a composition comprising nanomaterial onto a donor surface.

In certain embodiments, the method comprises depositing a layer comprising nanomaterial and a material capable of transporting change onto a donor surface. The method comprises applying a coating including a composition comprising nanomaterial and a material capable of transporting charge onto a donor surface from a micro-dispenser. In certain embodiments, the composition is deposited onto the donor surface in a predetermined arrangement (patterned or unpatterned) from a micro-dispenser.

In certain embodiments, the donor surface includes a surface modification such that the nanomaterial is reversibly attached to the donor surface. Examples of surface modifications include, without limitation, those discussed above as surface modifications that can be optionally included on a donor surface, transfer surface, and/or applicator. A preferred embodiment includes a coating of Parylene-C on the surface of the donor surface.

In another detailed aspect of the invention, the donor surface comprises a film. A film can comprise a sheet, a tape, a web, etc. Examples of film materials include, e.g., PET, Kapton, plastic, foil, paper, nylon, cloth, etc. A film can be flexible or rigid. In certain embodiments, a non-rigid film is preferred. In certain embodiments, a flexible film is more preferred. A film can optionally include other layers (patterned or unpatterned) and/or other features thereon.

In another aspect of the invention there is provided a method for making a device. The method comprises: providing a substrate; providing a film including a layer comprising nanomaterial disposed on a side thereof from a micro-dispenser, contacting the layer comprising nanomaterial to a surface of the substrate. In a detailed aspect, the layer comprising nanomaterial is contacted to the surface of the substrate under conditions to cause the layer comprising nanomaterial to deposit on the substrate. In a detailed aspect, the method can optionally further include removing the film from the layer of nanomaterial deposited on the surface.

In a certain embodiments, method for making a device comprises providing a substrate that may optionally further include an electrode, a charge transport layer, and/or additional layers or features; providing a film including a layer comprising semiconductor nanocrystals disposed on one side thereof from a micro-dispenser, contacting the layer comprising semiconductor nanocrystals to a surface of the substrate under conditions effect to cause the layer comprising semiconductor nanocrystals to deposit onto the surface of the substrate. In certain embodiments, the semiconductor nanocrystals are reversibly attached to the film, and the film is optionally removed. Optionally, additional layers (e.g., charge transport layer, charge blocking layer, electrode, other electrical features, etc.) may be disposed over the layer including semiconductor nanocrystals. The semiconductor nanocrystals may be light-emitting or light absorbing. The optional additional layers and/or features of the device are selected depending upon the type of device being made. For instance, embodiments of this method can be useful to make light-emitting devices, displays, photodetectors, hyperspectral imaging devices.

Materials capable of transporting charge include hole transport and electron transport layers. Either or both of these layers can comprise organic or inorganic materials. Examples of inorganic material include, for example, inorganic semiconductors. The inorganic material can be amorphous or polycrystalline. An organic charge transport material can be polymeric or non-polymeric.

An example of a typical organic material that can be included in an electron transport layer includes a molecular matrix. The molecular matrix can be non-polymeric. The molecular matrix can include a small molecule, for example, a metal complex. The metal complex of 8-hydroxyquinoline can be an aluminum, gallium, indium, zinc or magnesium complex, for example, aluminum tris(8-hydroxyquinoline) ($Alq_3$). Other classes of materials in the electron transport layer can include metal thioxinoid compounds, oxadiazole metal chelates, triazoles, sexithiophenes derivatives, pyrazine, and styrylanthracene derivatives. Balq2 is an example of another material that can be included in an electron transport layer. An electron transport layer comprising an organic material may be intrinsic (undoped) or doped. Doping may be used to enhance conductivity. See, for example, U.S. Provisional Patent Application No. 60/795,420 of Beatty et al, for "Device Including Semiconductor Nanocrystals And A Layer Including A Doped Organic Material And Methods", filed 27 Apr. 2006, which is hereby incorporated herein by reference in its entirety.

An example of a typical organic material that can be included in a hole transport layer includes an organic chromophore. The organic chromophore can include a phenyl amine, such as, for example, N,N'-diphenyl-N,N'-bis(3-methylphenyl)-(1,1'-biphenyl)-4,4'-diamine (TPD). Other hole transport layer can include N,N'-bis(3-methylphenyl)-N,N'-bis(phenyl)-spiro (spiro-TPD), 4-4'-N,N'-dicarbazolyl-biphenyl (CBP), 4,4-.bis[N-(1-naphthyl)-N-phenylamino]biphenyl (NPD), etc., a polyaniline, a polypyrrole, a poly (phenylene vinylene), copper phthalocyanine, an aromatic tertiary amine or polynuclear aromatic tertiary amine, a 4,4'-bis(p-carbazolyl)-1,1'-biphenyl compound, or an N,N,N',N'- tetraarylbenzidine. A hole transport layer comprising an organic material may be intrinsic (undoped) or doped. Doping may be used to enhance conductivity. Examples of doped hole transport layers are described in U.S. Provisional Patent Application No. 60/795,420 of Beatty et al, for "Device Including Semiconductor Nanocrystals And A Layer Including A Doped Organic Material And Methods", filed 27 Apr. 2006, which is hereby incorporated herein by reference in its entirety.

Charge transport layers comprising organic materials and other information related to fabrication of organic charge transport layers, light-emitting devices, and related technology are discussed in more detail in U.S. patent application Ser. No. 11/253,612 for "Method And System For Transferring A Patterned Material", filed 21 Oct. 2005, and Ser. No. 11/253,595 for "Light Emitting Device Including Semiconductor Nanocrystals", filed 21 Oct. 2005 and International Patent Application No. PCT/US2007/13152 for "Light-Emitting Devices And Displays With Improved Performance", filed 4 Jun. 2007. The foregoing patent applications are hereby incorporated herein by reference in its entirety.

Examples of a photodetector including semiconductor nanocrystals are described in "A Quantum Dot Heterojunction Photodetector" by Alexi Cosmos Arango, Submitted to the Department of Electrical Engineering and Computer Science, in partial fulfillment of the requirements for the degree of Masters of Science in Computer Science and Engineering at the Massachusetts Institute of Technology, February 2005, the disclosure of which is hereby incorporated herein by reference in its entirety, In certain embodiments, the method can be useful to make a non-volatile memory device. An example of such type of device is described in U.S. patent application Ser. No. 10/958,659, entitled "Non-Volatile Memory Device", of Bawendi et al., filed 6 Oct. 2004, the disclosure of which is hereby incorporated herein by reference in its entirety.

In some embodiments, the substrate can include a backplane. The backplane can include active or passive electronics for controlling or switching power to individual pixels. Include a backplane can be useful for applications such as displays, sensors, or imagers. In particular, the backplane can be configured as an active matrix, passive matrix, fixed format, directly drive, or hybrid. The display can be configured for still images, moving images, or lighting. A lighting display can provide white light, monochrome light, or color-tunable light. See, e.g., U.S. patent application Ser. No. 11/253,612, filed Oct. 21, 2005, the disclosure of which is hereby incorporated herein by reference in its entirety.

The method for making a device, or at least some of the steps thereof, can optionally be carried out in a controlled (oxygen-free and moisture-free) environment, preventing the quenching of luminescent efficiency during the fabrication process. Additional steps may optionally be further included in the method to make devices with multilayer structures (see, for example, U.S. patent application Ser. Nos. 10/400,907 and 10/400,908, filed Mar. 28, 2003, each of which is incorporated by reference in its entirety). A blocking layer, such as an electron blocking layer (EBL), a hole blocking layer (HBL) or a hole and electron blocking layer (eBL), can be introduced in the structure. A blocking layer can include 3-(4-biphenylyl)-4-phenyl-5-tert-butylphenyl-1,2,4-triazole (TAZ), 3,4,5-triphenyl-1,2,4-triazole, 3,5-bis(4-tert-butylphenyl)-4-phenyl-1,2,4-triazole, bathocuproine (BCP), 4,4',4"-tris{N-(3-methylphenyl)-N-phenylamino}triphenylamine (m-MTDATA), polyethylene dioxythiophene (PEDOT), 1,3-bis(5-(4-diphenylamino)phenyl-1,3,4-oxadiazol-2-yl)benzene, 2-(4-biphenylyl)-5-(4-tert-butylphenyl)-1,3,4-oxadiazole, 1,3-bis[5-(4-(1,1-dimethylethyl)phenyl)-1,3,4-oxadiazol-2-yl]benzene, 1,4-bis(5-(4-diphenylamino)phenyl-1,3,4-oxadiazol-2-yl)benzene, or 1,3,5-tris[5-(4-(1,1-dimethylethyl)phenyl)-1,3,4-oxadiazol-2-yl]benzene. In certain embodiments inorganic materials may be used to fabricate various of the above layers. See U.S. patent application Ser. No. 11/354,185, entitled, "Light Emitting Devices Including Semiconductor Nanocrystals", of Bawendi et al., filed 15 Feb. 2006, the disclosure of which is hereby incorporated herein by reference in its entirety.

The performance of light emitting devices can be improved by increasing their efficiency, narrowing or broadening their emission spectra, or polarizing their emission. See, for example, Bulovic et al., Semiconductors and Semimetals 64, 255 (2000), Adachi et al., Appl. Phys. Lett. 78, 1622 (2001), Yamasaki et al., Appl. Phys. Lett. 76, 1243 (2000), Dirr et al., Jpn. J. Appl. Phys. 37, 1457 (1998), and D'Andrade et al., MRS Fall Meeting, BB6.2 (2001), each of which is incorporated herein by reference in its entirety. Nanocrystals can be included in efficient hybrid organic/inorganic light emitting devices.

In various instances herein, a semiconductor nanocrystal may be referred to by the term "nanocrystal".

All the patents and publications mentioned above and throughout are incorporated in their entirety by reference herein.

It will be apparent to those skilled in the art that various modifications can be made in the methods, articles and systems of the present invention without departing from the spirit or scope of the invention. Thus, it is intended that the present invention cover modifications and variations of this invention provided they come within the scope of the appended claims and their equivalents.

What is claimed is:

1. A method of depositing semiconductor nanocrystals and a charge transport material onto a substrate comprising:
    depositing a composition comprising inorganic light emissive semiconductor nanocrystals that emit light having a predetermined wavelength, a non-polymeric material capable of transporting charge that has a triplet energy which is at least greater than the bandgap of the semiconductor nanocrystals, and liquid onto a surface of a donor film from a micro-dispenser, wherein the semiconductor nanocrystals are individually dispersed in the composition, and depositing at least a portion of the composition disposed on the donor film surface onto the substrate by contacting the composition deposited on the donor film surface to the surface of the substrate under conditions to cause the composition to deposit onto the substrate, and removing the donor film from the deposited composition.

2. A method in accordance with claim 1 further comprising removing liquid from the composition disposed on the donor film before depositing at least a portion of substantially liquid-free composition onto the substrate.

3. A method for making a light-emitting device comprising:
    providing a substrate including an electrode;
    providing a film including a layer comprising a composition including a light-emitting nanomaterial and a non-polymeric material capable of transporting charge disposed on a side thereof, wherein the light-emitting nanomaterial comprises inorganic light emissive semiconductor nanocrystals that emit light having a predetermined wavelength and wherein the semiconductor nanocrystals are individually dispersed in the composition, and wherein the material capable of transporting charge has a triplet energy which is at least greater than the bandgap of the semiconductor nanocrystals;

contacting the film including the layer to a surface of the substrate including the electrode under conditions to cause the layer to be deposited on the substrate; removing the film from the layer deposited on the surface; and disposing a second electrode over the layer.

4. A method in accordance with claim 3, wherein the substrate further includes a hole transport material, an electron transport material, a hole injection material, an electron injection material, or a combination thereof.

5. A method in accordance with claim 3 wherein the semiconductor nanocrystals comprise a core/shell structure.

6. A method in accordance with claim 5 wherein the core comprises a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, an alloy including any of the foregoing, or a mixture including any of the foregoing.

7. A method in accordance with claim 6 wherein the shell comprises a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, an alloy including any of the foregoing, or a mixture including any of the foregoing.

8. A method in accordance with claim 1 wherein the donor film comprises a sheet, a film, a tape, or a web.

* * * * *